US012675905B2

(12) United States Patent
    Kulp

(10) Patent No.: US 12,675,905 B2
(45) Date of Patent: Jul. 7, 2026

(54) SYSTEM AND METHOD FOR 3D MEASUREMENT AND IMAGING

(71) Applicant: Climate Central, Princeton, NJ (US)

(72) Inventor: Scott A. Kulp, Kendall Park, NJ (US)

(73) Assignee: CLIMATE CENTRAL, Princeton, NJ (US)

( * ) Notice: Subject to any disclaimer, the term of this patent is extended or adjusted under 35 U.S.C. 154(b) by 302 days.

(21) Appl. No.: 18/593,411

(22) Filed: Mar. 1, 2024

(65) Prior Publication Data

US 2024/0296583 A1     Sep. 5, 2024

Related U.S. Application Data

(60) Provisional application No. 63/449,425, filed on Mar. 2, 2023.

(51) Int. Cl.
    *G06T 7/73*          (2017.01)
    *G06T 7/55*          (2017.01)
(52) U.S. Cl.
    CPC .................. *G06T 7/74* (2017.01); *G06T 7/55* (2017.01); *G06T 2207/10016* (2013.01); *G06T 2207/10028* (2013.01); *G06T 2207/20084* (2013.01); *G06T 2207/30184* (2013.01)
(58) Field of Classification Search
    CPC ... G06T 7/74; G06T 7/55; G06T 2207/10016; G06T 2207/10028; G06T 2207/20084; G06T 2207/30184; G06T 7/73
    See application file for complete search history.

(56) References Cited

U.S. PATENT DOCUMENTS

| | | | | | |
|---|---|---|---|---|---|
| 11,107,025 | B2 * | 8/2021 | Sun | .......................... | G06F 30/10 |
| 11,120,557 | B1 * | 9/2021 | Klose | ....................... | G06N 3/08 |
| 11,428,816 | B2 * | 8/2022 | Koger | ..................... | G06F 30/13 |
| 11,532,093 | B2 | 12/2022 | Mantey et al. | | |
| 11,555,701 | B2 * | 1/2023 | Du | ............................ | G06N 3/09 |
| 2019/0004533 | A1 * | 1/2019 | Huang | ..................... | G01S 17/86 |
| 2020/0348132 | A1 * | 11/2020 | Du | .......................... | G06V 20/20 |
| 2021/0110564 | A1 * | 4/2021 | Mantey | ..................... | G06T 3/40 |
| 2022/0027531 | A1 * | 1/2022 | Choi | ........................ | G06F 30/13 |
| 2022/0383436 | A1 | 12/2022 | Kozikowski et al. | | |

(Continued)

*Primary Examiner* — Wesley J Tucker
(74) *Attorney, Agent, or Firm* — Meagher, Emanuel, Laks, Goldberg & Liao, LLP

(57)                    ABSTRACT

Techniques for three-dimensional measurement and imaging may be provided. Systems may include an integrated instrument package, and remote processors. The instrument package may include video cameras, LiDAR sensors, a GPS receiver, a controller, and a data acquisition and control computer. The instrument package may be configured to synchronize the camera shutters to produce simultaneous images, LiDAR sensor data returned point cloud frames and images, and GPS position readings. The remote processors may be configured to compare the images to create a stereoscopic effect and infer depth of field from parallax, align lidar point cloud frames and images with a spatially and temporally consistent image and video frame, then associate it with GPS position readings, assign relative 3D coordinates to every pixel in an image, transform the relative coordinates into absolute 3D coordinates, and identify objects in the image and infer a GPS position and elevation of the objects.

18 Claims, 24 Drawing Sheets

(56) References Cited

U.S. PATENT DOCUMENTS

| | | | |
|---|---|---|---|
| 2023/0100515 A1* | 3/2023 | Du ........................... | G06N 3/08 |
| | | | 382/106 |
| 2024/0151851 A1* | 5/2024 | Koger ................... | G01C 15/008 |
| 2024/0290088 A1* | 8/2024 | Roy ....................... | B64U 10/13 |
| 2025/0245917 A1* | 7/2025 | Rashed ..................... | G06T 7/13 |

* cited by examiner 411
410
416

810          820

1110

118  117

1211　1210　1212

1310

SYSTEM AND METHOD FOR 3D MEASUREMENT AND IMAGING

CROSS-REFERENCE TO RELATED APPLICATIONS

The present application claims priority to U.S. Provisional Patent Application 63/449,425, filed Mar. 2, 2023, the contents of which are incorporated by reference herein in its entirety.

TECHNICAL FIELD

The present disclosure is drawn to the field of environmental risk determination, and specifically to the use of 3D measurement and imaging for determining risks from environmental factors such as, e.g., flooding.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional techniques for assessing flood risk are highly manual and can take significant amounts of time and money. Further, such conventional techniques do not result in output that allows for users to visualize such risks.

BRIEF SUMMARY

Various deficiencies in the prior art are addressed below by the disclosed compositions of matter and techniques.

In various aspects, a three-dimensional (3D) measurement and image system may be provided. The system may include one or more processors coupled to one or more non-transitory computer-readable storage devices. The non-transitory computer-readable storage devices may contain instructions that, when executed, configure the one or more processors to perform certain steps. The processor(s) may be configured to receive synchronized still images and/or video frames, lidar point cloud frames and/or images, and GPS position readings. The processor(s) may be configured to align lidar point cloud frames and/or images with a spatially and temporally consistent image and/or video frame. The processor(s) may be configured to associate GPS position readings with corresponding lidar point cloud frames and images. The processor(s) may be configured to assign 3-dimensional coordinates, relative to a position of a LiDAR sensor, to every pixel in the spatially and temporally consistent image and/or video frame. The processor(s) may be configured to transform the relative-position 3-dimensional coordinates for every pixel into 3-dimensional coordinates referenced to GPS coordinates and one or more vertical elevation datums. The processor(s) may be configured to use a neural network to identify an object and/or environmental feature in the at least one of the still images. The processor(s) may be configured to infer a GPS position and elevation of the object and/or environmental feature based on the 3-dimensional coordinates referenced to GPS coordinates and one or more vertical elevation datums for pixels representing the object and/or environmental feature. The processor(s) may be configured to determine a first-floor elevation of a building and/or elevation of an attached garage slab or floor based on the elevation of the object and/or environmental feature.

In some embodiments, the object and/or environmental feature may be a door or a grade adjacent to a building foundation. In some embodiments, the one or more processors may be further configured to associate the building with a street address based on the 3-dimensional coordinates referenced to GPS coordinates and one or more vertical elevation datums.

In some embodiments, the one or more processors may be further configured to transform data from the lidar point cloud frames and/or images and spatially and temporally consistent image and/or video frame into a format adapted for use in automatically filling out a plurality of fields on a FEMA National Flood Insurance Program Elevation Certificate.

In some embodiments, the one or more processors may be configured to determine the elevation of a top of a bottom floor, a top of a next higher floor, a lowest adjacent grade next to the building, highest adjacent grade next to the building, and/or the lowest adjacent grade at a lowest elevation of a deck or stairs. In some embodiments, the neural network may identify machinery or equipment next to a building, and the one or more processors may be configured to determine a lowest elevation of machinery or equipment servicing the building, the machinery or equipment being identified by the neural network. In some embodiments, the one or more processors may be configured to determine elevations of a critical infrastructure component, the critical infrastructure component being identified by the neural network. In some embodiments, the one or more processors may be configured to determine the elevation of the bottom of floors and doors of parked vehicles.

In some embodiments, the one or more processors may be configured to produce a photo-realistic image and/or video with water fit to and around objects in the at least one of the still images according to a determined elevation. In some embodiments, the one or more processors may be configured to combine a first-floor elevation and a photo-realistic image with at least one other location-specific data point, the at least one other location-specific data point is a property ownership, a map location, an address, a valuation, a land use, or a combination thereof. In some embodiments, the one or more processors may be configured to combine the first-floor elevation and the photo-realistic image with at least one other location-specific data point, such as a property ownership, a map location, an address, a valuation, a land use, or a combination thereof.

In some embodiments, the one or more processors may be configured to produce modelled elevation data for the first-floor elevation for an individual property or a plurality of properties in a defined geographic area.

In some embodiments, the one or more processors may be configured to compare video frames and/or still images from two or more video cameras and infer depth of field from of parallax from the video frames and/or still images. In some embodiments, the one or more processors may be configured to determine a probability that the object and/or environmental feature will be below a determined elevation.

In some embodiments, the system may include an integrated instrument package mounted on a vehicle (such as an automobile). The integrated instrument package may include a plurality of video cameras mounted at a same relative elevation and oriented to produce parallel views creating a stereoscopic effect. The integrated instrument package may include at least one light detection and ranging (LiDAR) sensor. The integrated instrument package may include at least one global positioning system (GPS) receiver. The integrated instrument package may include a data acquisition and control computer. The integrated instrument package may include controller circuitry operably coupled to the plurality of video cameras, the plurality of LiDAR sensors, the GPS receiver, and the data acquisition and control computer. The controller circuitry may be configured to synchronize shutters of the plurality of video cameras to produce precisely timed simultaneous video frames and still images, LiDAR sensor data returned point cloud frames and images, and GPS position readings.

In some embodiments, the controller and data acquisition and control computer, may be positioned within the vehicle (e.g., a passenger cabin of a car), and the plurality of video cameras, plurality of LiDAR sensors, and GPS receiver are mounted on top of a mounting plate that is coupled to the top of the vehicle.

BRIEF DESCRIPTION OF FIGURES

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION

Figure 1:
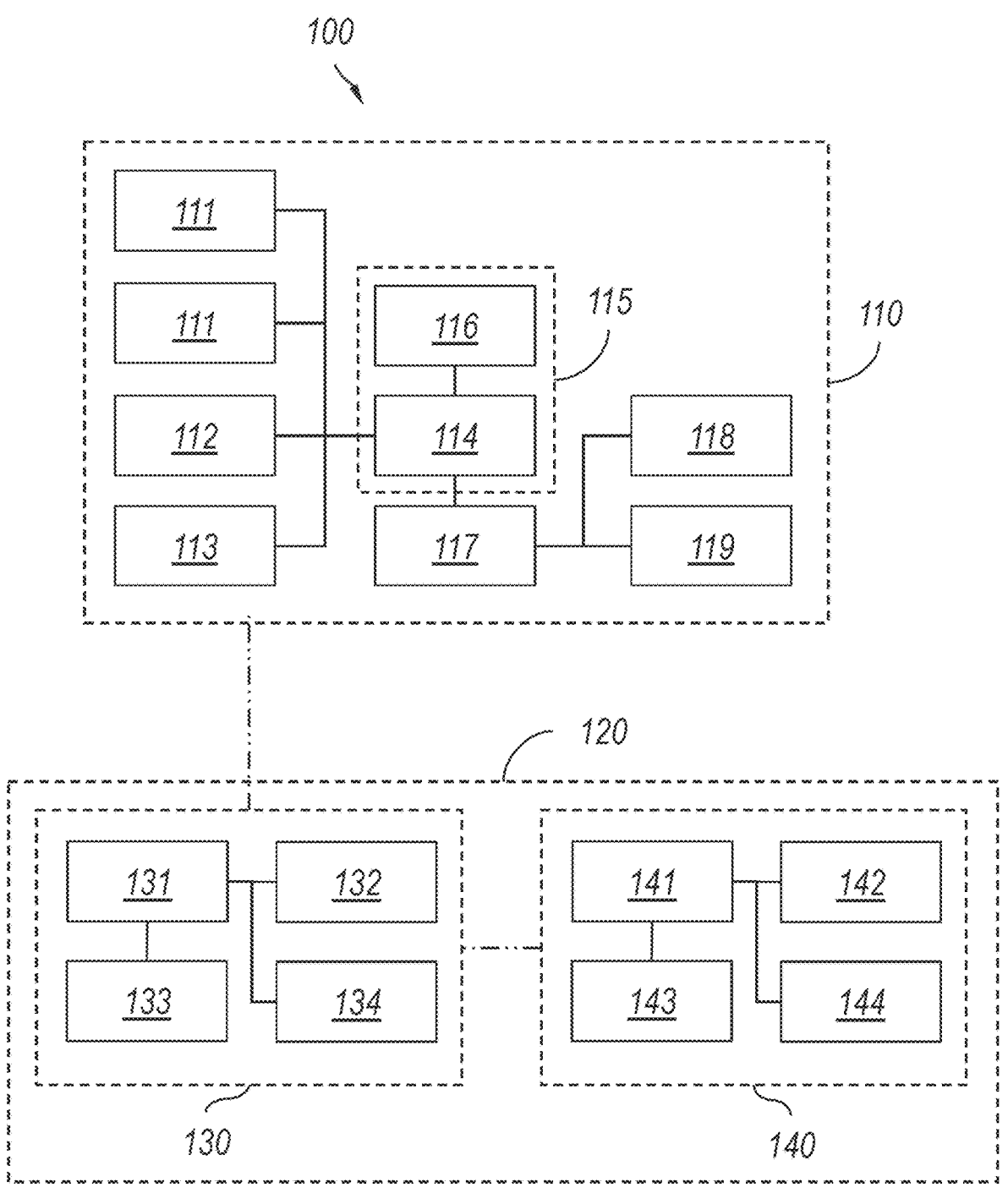
FIG. 1 is a block diagram showing components of a system.

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

In various embodiments, components, equipment, and methods may be provided for:

1) Gathering multiple-view and synchronized video images (later converted to still images), lidar images and data, and 3d (latitude, longitude, and elevation) GPS data from a moving vehicle on public roadways;

2) Fusing aforesaid synchronized video and lidar data into a 3D representation of the built environment wherein every visible pixel has spatial coordinates X, Y, and Z relative to the lidar emitting/sensing unit;

3) Establishing multiple ground control points (GCPs) with targets visible to the cameras, measuring those with a stationary and independent GPS, and using them to compare and calibrate with data from the cameras and lidar described below;

4) Solving boresight angles and lever arm between cameras and GPS inertial measurement unit (IMU) and transforming the aforesaid relative $X_R$, $Y_R$, and $Z_R$ coordinates of each lidar pixel into absolute coordinates of latitude($X_A$), longitude($Y_A$), and elevation($Z_A$) relative to a geodetic datum(s);

5) A generalized method of identifying objects of interest in the images and 3d spatial representations using neural network(s) in order to query and return the aforesaid absolute coordinates of the object where an example is the bottom of an entry door as a proxy for the top of a first finished floor (hereafter referred to as first floor elevation or FFE);

6) Employing any combination of sea surface, sea level rise, tide, flood, and storm surge model current, forecast, or future outputs specific to the latitude($X_A$) and longitude($Y_A$) of the location in order to determine the elevation($Z_A$) of a modelled water surface and subsequently determine whether each pixel is above or below the modelled water surface according to its $X_A$, $Y_A$, and $Z_A$ coordinates;

7) Using the pixels associated with identified objects to determine whether said objects are inundated, partially inundated, or not inundated by the modelled water surface;

8) Using a neural network to estimate a complete 3D reconstructed X, Y, and Z map for any image;

9) Using a neural network(s) to fit a synthetic water surface with realistic attributes including color, opacity, wind effects, and surface effects such as waves, splashes, and ripples and having $X_A$, $Y_A$, and $Z_A$ coordinates to the built environment image where each pixel has $X_A$, $Y_A$, and $Z_A$ coordinates so as to produce a photo-realistic image and/or video with water fit to and around objects in the image according to elevation $Z_A$;

10) Producing photo-realistic flood images for multiple modelled water levels for each individual property, properties on a street, properties in a neighborhood, zip code, or community;

11) Producing modeled elevation data for FFE for individual property, properties on a street, properties in a neighborhood, zip code, or community;

12) Combining FFE data and photo-realistic flood images with other location-specific data such as property ownership, map location, address; and/or 13) Producing modelled elevation data of other features objects critical to the use and service of buildings, such as the lowest adjacent grade and other elements found on FEMA elevation certificates, the bottom of floors and doors of parked vehicles, and other equipment or infrastructure.

Figure 2:
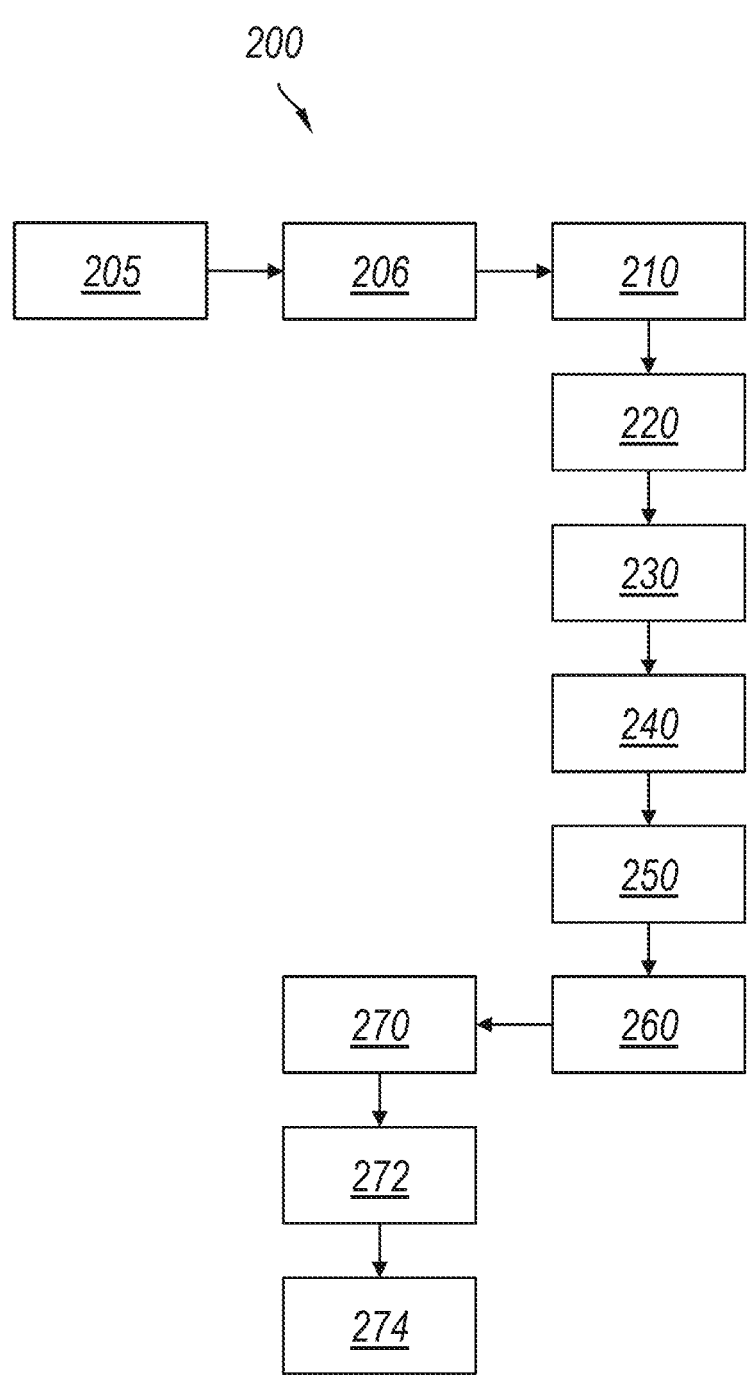
FIG. 2 is a flowchart of a method.

Referring to FIGS. 1 and 2, in some embodiments, a system may be provided. The system (100) may include components related primarily to data capturing (110) and components related primarily to data processing (120).

In some embodiments, the components related primarily to data capturing may include portable and/or vehicle-mountable components. In some preferred embodiments, the vehicle may be an automobile. In some embodiments, the vehicle may be automated. In some embodiments, the vehicle may be remotely controlled.

In some embodiments, the components related primarily to data capturing may include some components that are preferably mounted on top of a vehicle (or that otherwise has unrestricted views to at least one side of the vehicle).

Figure 3A:
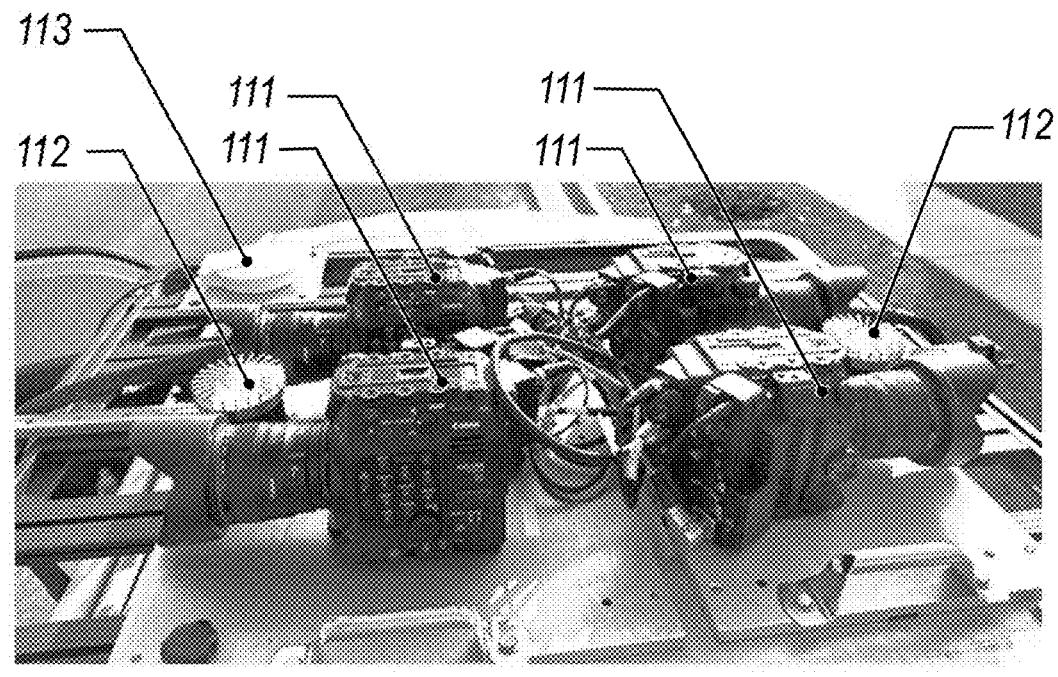
FIG. 3A is an image of modules for an integrated instrument package, the modules containing 4 Cameras and 2 Lidar Units Total, 2 Cameras 1 Lidar Each Side.

Such vehicle-mounted components may include video cameras (111), such as a plurality of video cameras. The video cameras may preferably include high-resolution video cameras (e.g., containing an imaging sensor with an effective number of pixels of at least about 8 megapixels). The video cameras may preferably be arranged in pairs. Each pair of high-resolution video cameras may be configured to face a side of the vehicle. In some embodiments, there are four cameras in total (two facing to the left, and two facing to the right). See FIGS. 3A, 3B. Each pair is aligned such that the captured images from each pair can produce a stereographic video stream at 90 degrees relative to the vehicle's heading, i.e., a side-view, of the view typically of the built environment as the vehicle passes along the roadway.

In some embodiments, the system is preferably free of cameras capturing images to the front and rear of the vehicle.

Figure 4:
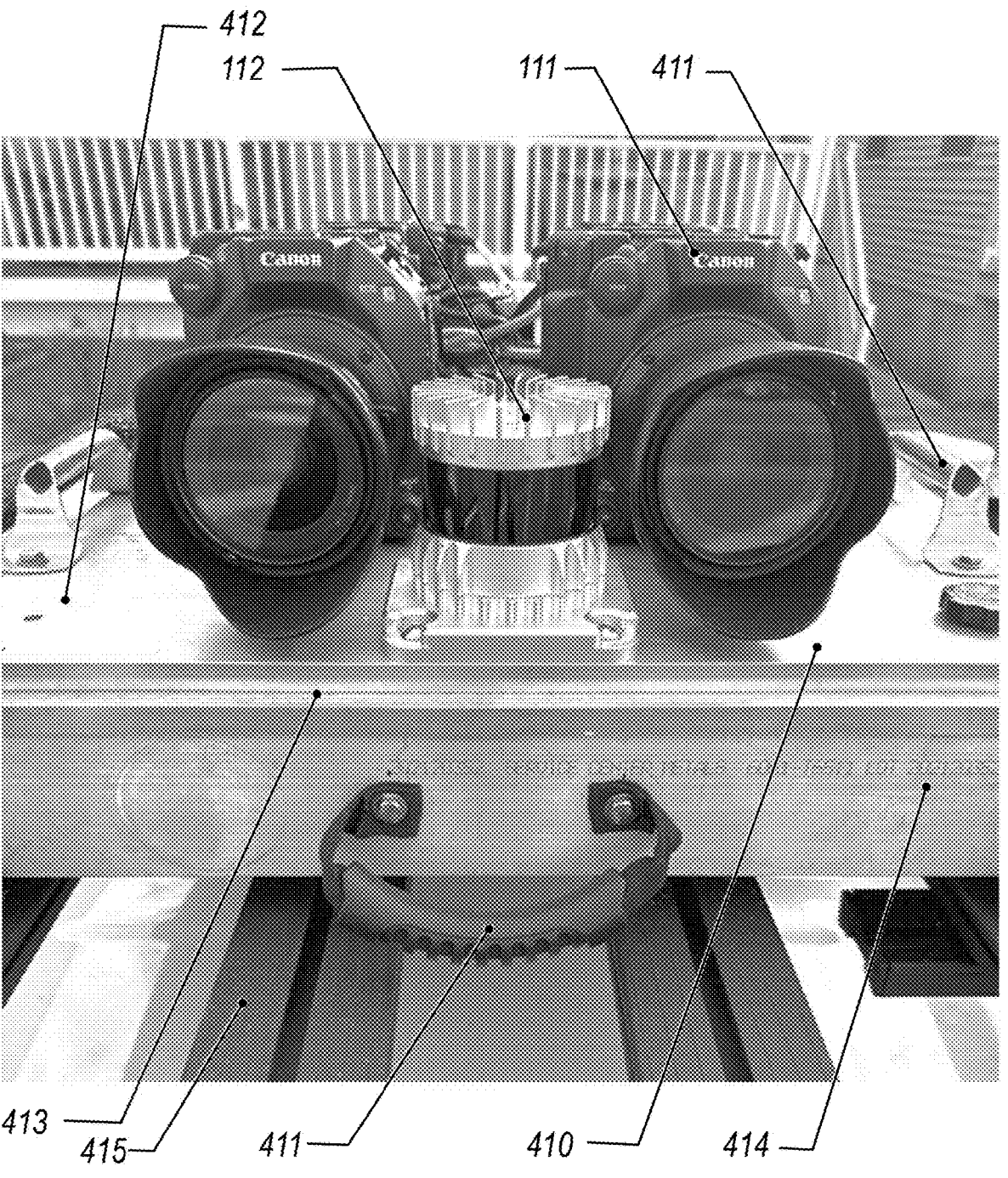
FIGS. 4 and 5 are images of mounting plates of the modules for the integrated instrument package, each configured to mount 2 cameras and a lidar unit, and including a handle.

The vehicle-mounted components may include a LiDAR transceiver unit (112). The vehicle-mounted components may include one LiDAR transceiver unit. The vehicle-mounted components may include a plurality of LiDAR transceiver units. In some embodiments, there is at least one LiDAR transceiver unit for each direction in which each pair of video cameras is facing. Preferably, there is one LiDAR transceiver unit on each side of the vehicle, mounted in the same orientation as the two video cameras on that side of the vehicle. In FIG. 4, the transceiver unit can be seen mounted between the lenses of a pair of video cameras.

Any appropriate LiDAR transceiver unit may be utilized.

The vehicle-mounted components may include a mounting plate. As seen in FIG. 4, a mounting plate (410) may be used to mount the video cameras (111) and LiDAR transceiver unit (112). The mounting plate may be any appropriate rigid material. In some embodiments, the mounting plate may be aluminum. These mounting plates are preferably engineered and precision-machined to allow setup and removal while maintaining an accuracy in orientation repeatability to within 0.001 inch.

Figure 5:
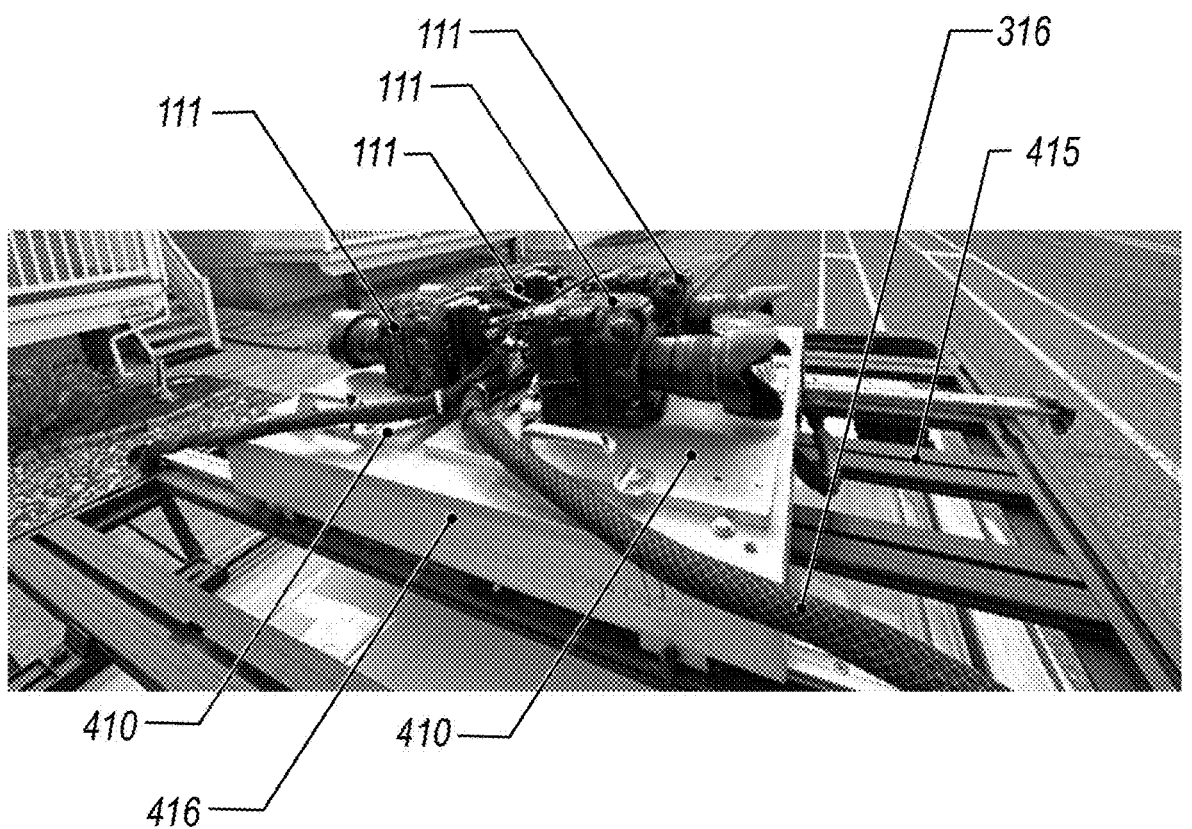

As seen in FIG. 4, a mounting plate (410) may include a handle (411). In some embodiments, at least one handle is on a surface (e.g., a top surface (412)) of the mounting plate that is the same surface the video cameras are coupled to. In some embodiments, a second surface (e.g., a bottom surface (413)) of the mounting plate may be coupled directly or indirectly to the vehicle. In some embodiments, the bottom surface (413) of the mounting plate (410) may be coupled to an additional mounting block (414), the additional mounting block being configured to be coupled to, e.g., a vehicle roof-mount system (415), such as a commercial roof-rack mounting system. In FIG. 5, the video cameras and LiDAR transceiver units can be seen on separate mounting plates, indirectly coupled to a vehicle roof-mount system (415).

Figure 6:
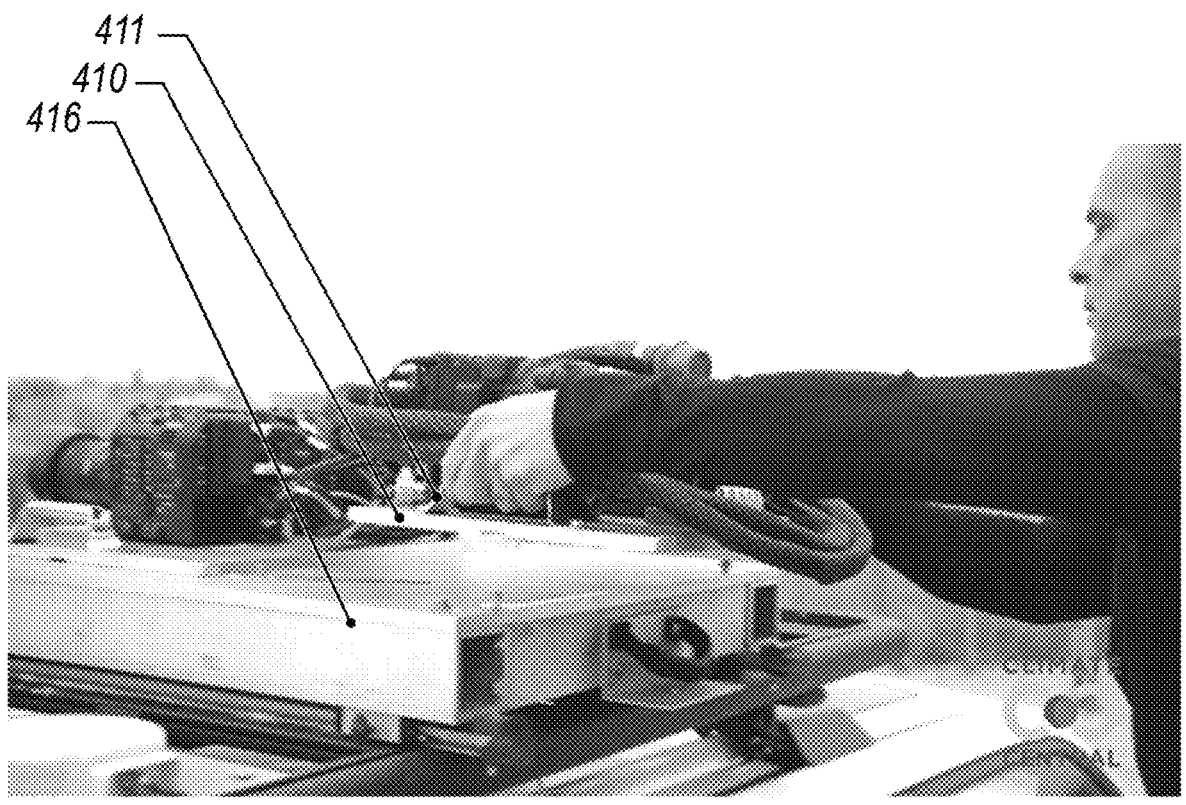
FIG. 6 is an image showing the mounting of the modules of the integrated instrument package on a vehicle.

FIG. 6 shows a person holding the handles (handle (411) is shown) on the mounting plate (410) containing the cameras and LiDAR unit for placement on to the additional mounting block (416) on the roof of the vehicle.

The vehicle-mounted components may include a GPS receiver antenna (113). Preferably, the components may include two roof-mounted GPS receiver antennae. Any appropriate GPS receiver antennae may be used. The GPS may be mounted on the same mounting plate that contains the video cameras. The GPS may be mounted on a mounting plate separate from a mounting plate containing the video cameras.

Figure 3B:
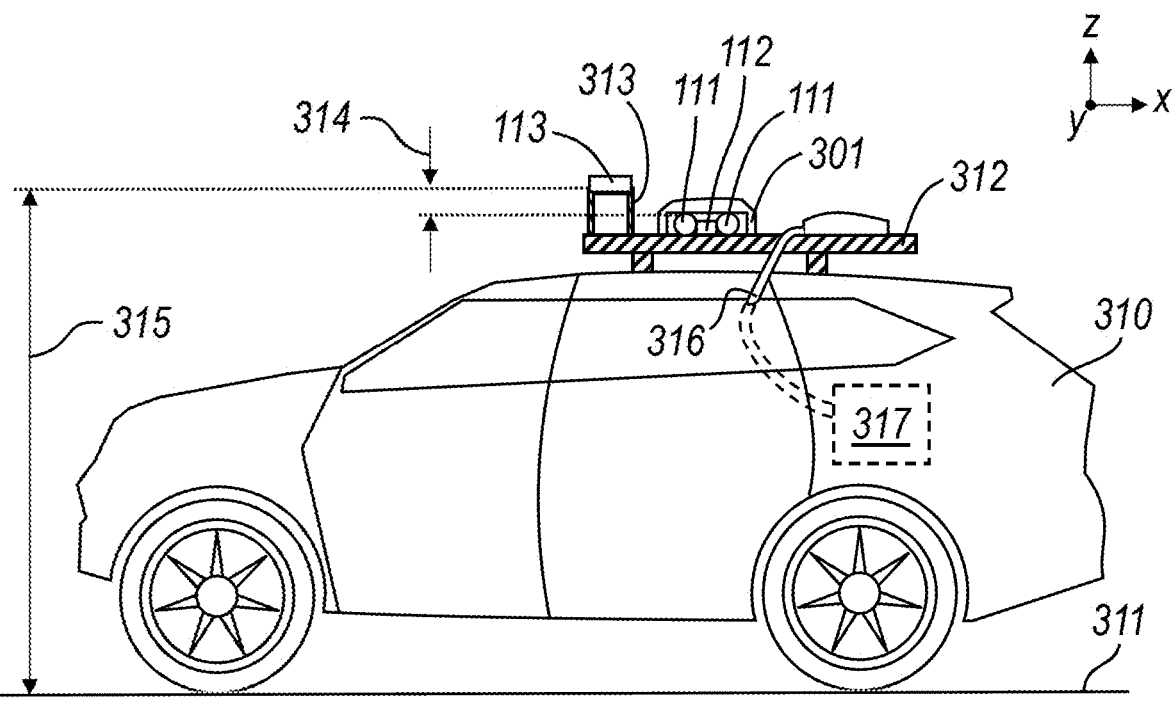
FIG. 3B is an illustration of a sideview of a vehicle with roof-mounted components.

In some embodiments, the antennae are mounted on opposite sides of the video cameras. For example, in some embodiments, one antenna is mounted towards the front of the vehicle, and one is mounted towards the rear of the vehicle, with the video cameras and LiDAR transceivers disposed between them. In some embodiments, the antennae are mounted on the left and right side of the vehicle, with the video cameras and LiDAR transceivers disposed between them. In some embodiments, the antennae are mounted on raised platforms to be positioned above the video cameras. For example, as seen in FIG. 3B, a vehicle (310) is shown on a roadway (311). The various components may be mounted on a rack (312) mounted on top of the vehicle (e.g., a roof mounted platform). The video cameras (111) and LiDAR transceiver unit (112) for a single side of the vehicle (here, the left side) are shown, positioned within a protective housing (301) disposed at least partially around the cameras and transceiver. The GPS receiver antenna (113) is shown as being mounted on a platform (313). This may allow the GPS receiver antenna (113) to be positioned a distance (314) above (e.g., in the z-direction in FIG. 3B, generally perpendicular to the roadway (311)) the video cameras (111). In FIG. 3B, the GPS receiver is also shown as being shifted in the xy-plane relative to the video cameras. Here, it is shown as being shifted forward on the vehicle in the xy-plane from the cameras. However, it may also be shifted in any direction in the xy-plane. As shown, the GPS receiver antenna is positioned a distance (315) above the roadway (311). This distance may at least 4 feet, at least 5 feet, at least 6 feet, or at least 7 feet. The distance may be at most 10 feet, at most 9 feet, at most 8 feet, or at most 7 feet. This may be true any time the GPS antenna is fixed to the vehicle, whether it is located external or internal to the vehicle.

The vehicle-mounted components may include an engineered cable system containing power and signal components for all the roof-mounted equipment. A cable, which may be an engineered cable system (316), is shown in FIG. 3B, operably coupled to the external components. Signals on these cables may operate at 10 Gbps. These cables may be configured to couple the external components to components (such as an electronics control box (317)) positioned internal to the vehicle. This can be seen in FIGS. 7-10.

Figure 7:
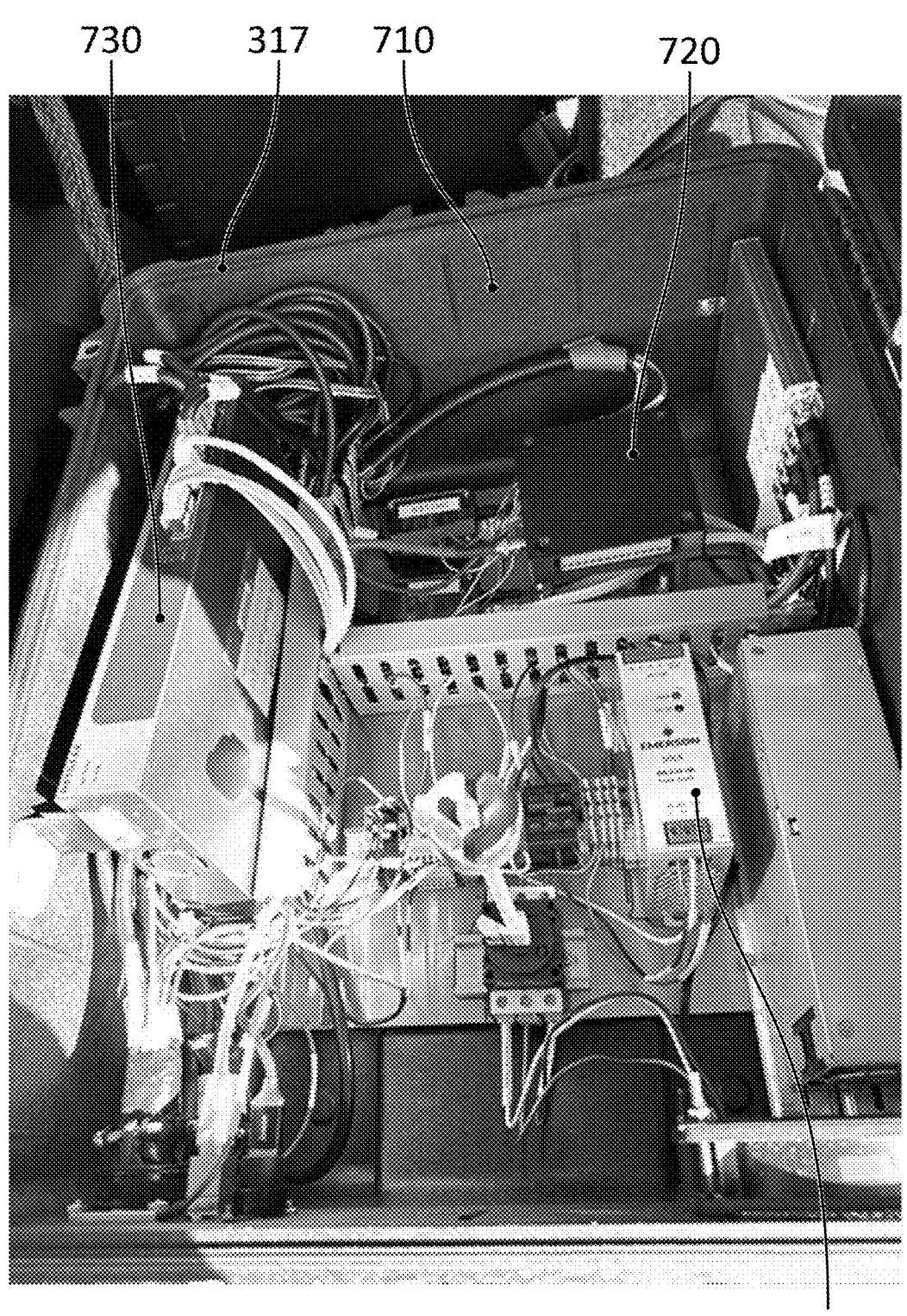
FIG. 7 is an image of the interior of the electronics control box.
Figure 8:
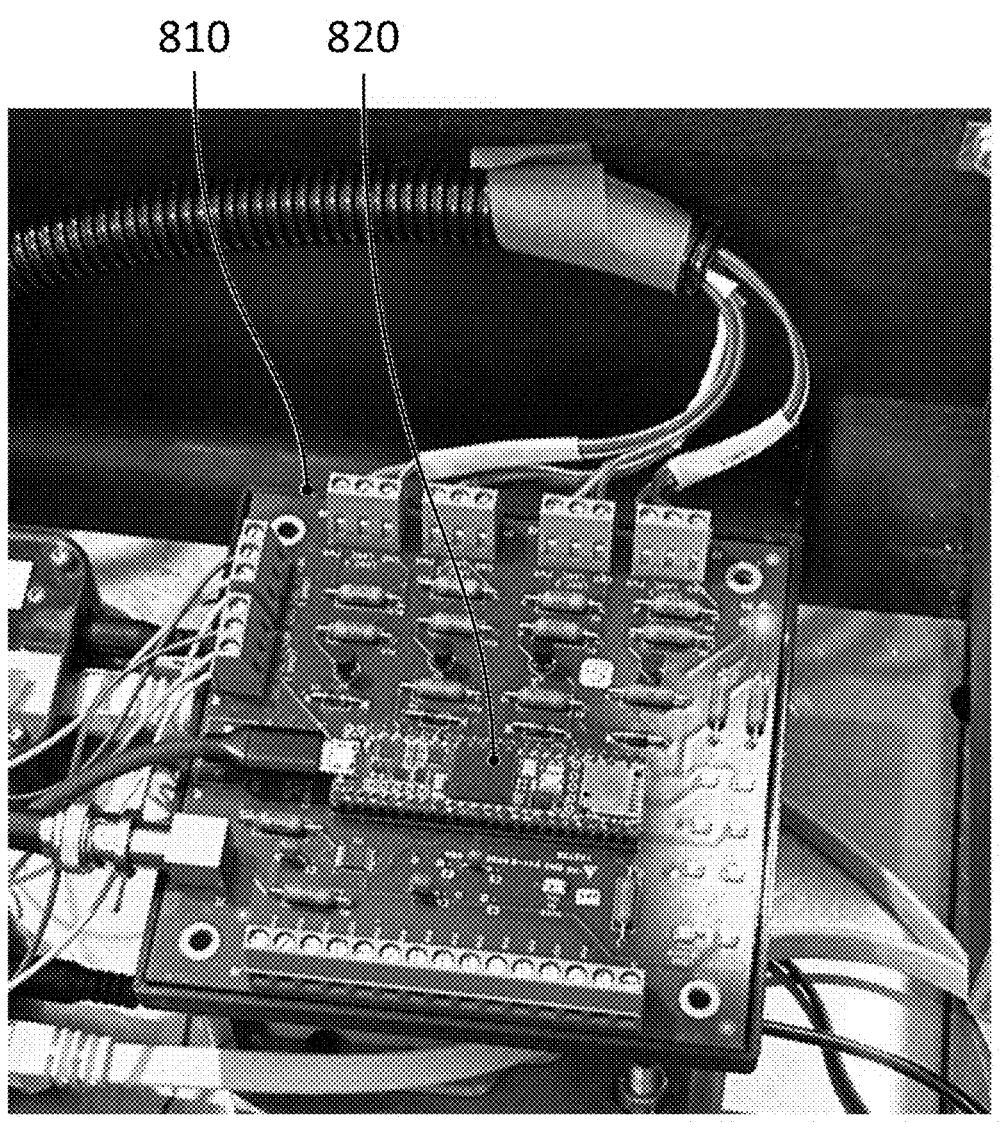
FIG. 8 is an image of an assembled printed circuit board (PCB) with a processor, used in the electronics control box of FIG. 7.

Referring to FIG. 1, the components typically positioned internal to the vehicle may include a controller (114). Referring to FIG. 7, the electronics control box (317) may be positioned internal to the vehicle. The electronics control box may include a housing (710) around various electronic components. A second housing (720) may be positioned within the electronics control box. In FIG. 7, examples of components within the control box can be seen. The second housing (720) may be around a printed circuit board (PCB), which may be coupled to one or more components within the box, including, e.g., a communication transceiver (730), a power supply (740), etc. In FIG. 8, a PCB (810) containing a controller (820) can be seen.

The terms "processor" or "controller" as used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The controller may be positioned within a housing (115), such as an electronics control box (317). The controller may be coupled to one or more other circuits or components (116) within the housing, such as a non-transitory computer readable storage medium containing instructions that, when executed by the controller, configured the controller to perform specific steps.

Figure 9:
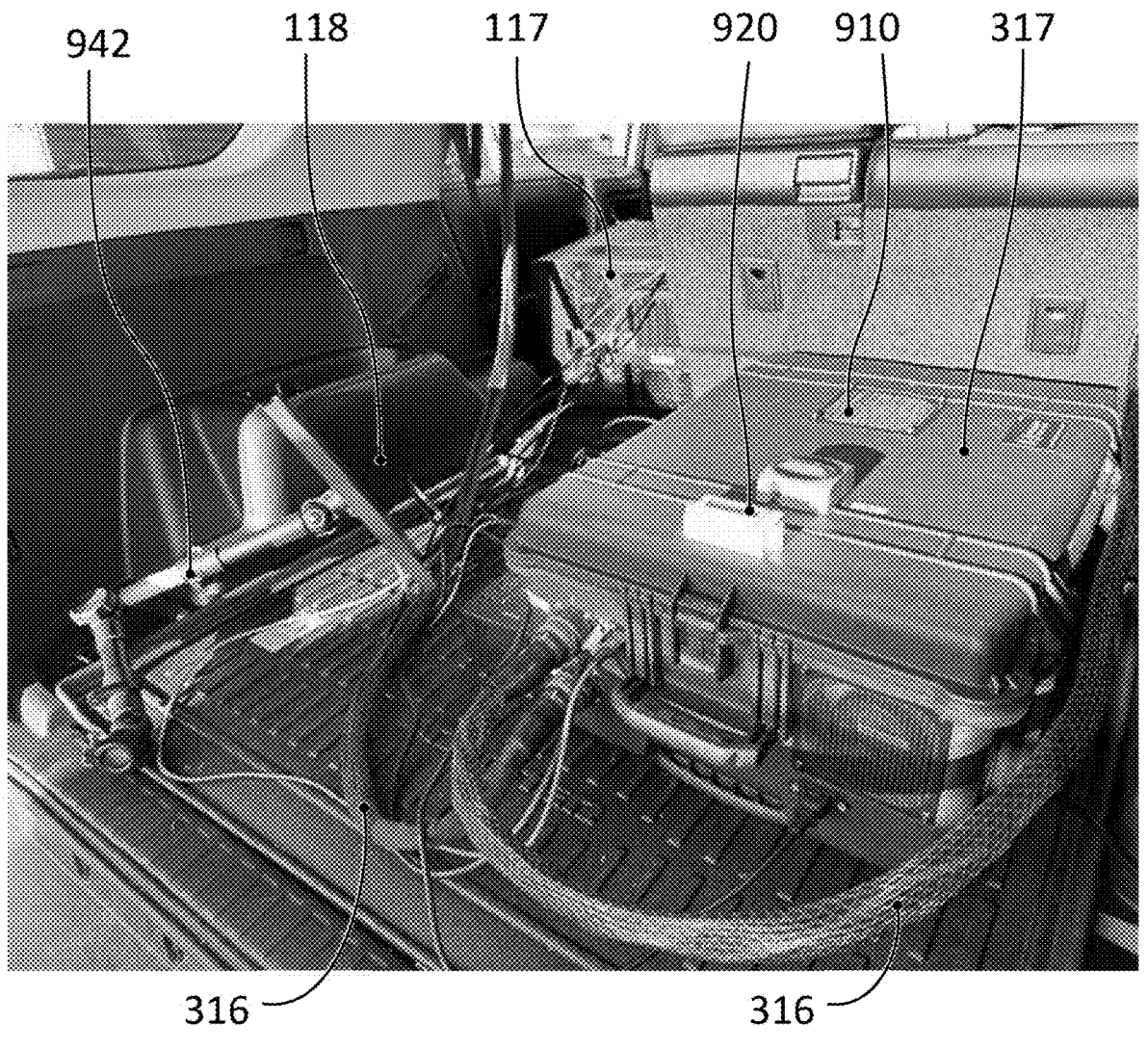
FIG. 9 is an image of the electronics control box with cooling fans and a temperature monitor.

The housing, typically positioned inside the vehicle, may include, e.g., one or more power supplies, an assembled PCB with a processor that controls the four cameras' recording functions remotely, and may be configured to provide synchronization signals to the video cameras and LiDAR transceivers. The housing control box may be cooled with fans and may have one or more temperature sensors included to monitor the temperature within the housing. The housing is preferably weather resistant or weatherproof. An example of the electronics control box may be seen in FIG. 9 without other components being shown. In FIG. 9, the electronics control box (317) with cooling fans (910) and a temperature monitor (920) can be seen inside a vehicle, with the engineered cable system (316) attached (one cable for each pair of cameras is shown). Further, a data acquisition and control device (117) can be seen coupled to the control box, as well as a monitor (118) coupled to the data acquisition and control device. A mounting arm (940) can be seen in the image, coupled to the monitor, for mounting the monitor within the vehicle. The monitor may be a display. The display may be a display associated with a tablet or laptop computer.

Figure 10:
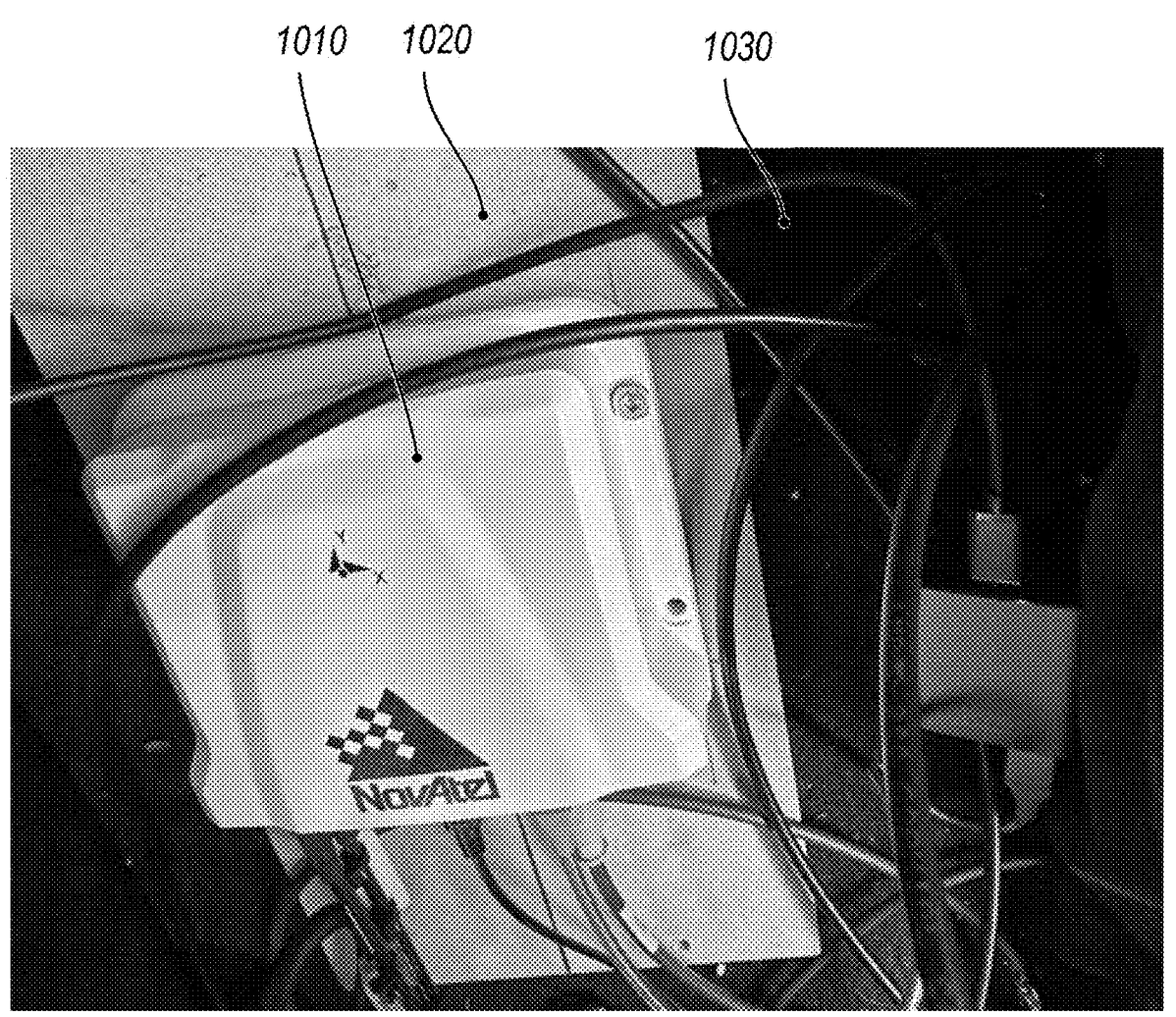
FIG. 10 is an image of a precision GPS system mounted near the center of the vehicle, inside the cabin, at a fixed height above the roadway; external antennae serving the GPS unit are affixed to the roof of the vehicle during operation.

The components that may be positioned internal to the vehicle may include a precision GPS system. Referring to FIG. 10, in one embodiment, the GPS unit (1010) may be rigidly (or fixedly) directly or indirectly coupled to an internal surface (1030) of the roof of the vehicle. The GPS unit may contain a receiver board, and may include one or more connections that allow the GPS unit to be removably couplable to one or more GPS antennae.

In some embodiments, the GPS unit may be coupled a mounting block (1020), which may be coupled to an internal surface (1030) of the roof of the vehicle. The GPS unit (1010) may be mounted at a fixed height above the roadway (such as 5 feet to 10 feet above the roadway) and a fixed position and orientation relative to the video cameras. During operating, the antennae serving the GPS unit may be affixed to the roof of the vehicle, or on raised platforms attached to the roof of the vehicle.

Referring to FIG. 1, the components typically positioned internal to the vehicle may include a data acquisition and control device (117), which may include one or more processors (not shown). In some embodiments, the data acquisition and control device may include or be coupled to a monitor (118). In some embodiments, the data acquisition and control device may be coupled to a wired and/or wireless communication transceiver (119).

In some embodiments, a removable onboard computer (e.g., one of the processors included in the data acquisition and control device) may record signal data. The signal data may include data from a GPS. The signal data may include signal data from a lidar transceiver (and preferably all lidar transceivers). In some embodiments, the signal data may include signal data from a video camera (and preferably all video cameras). In some embodiments, at the end of system data collection from vehicle operations, this computer may be used to transfer data from memory cards in each of the four cameras, which may be, e.g., less than 500 GB, 500 GB-1 TB, or 1 TB or more of data, depending on, e.g., the length of time the device is used to collect information.

Figure 11A:
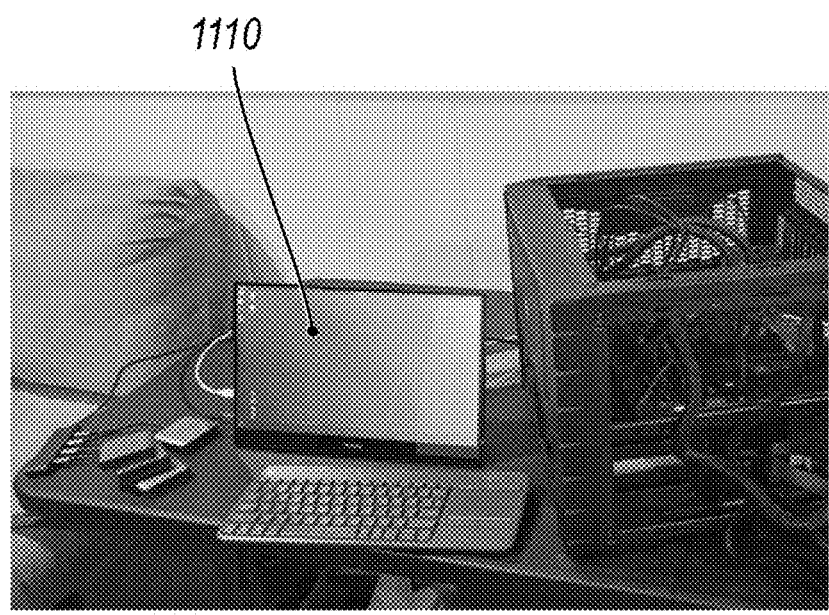
FIG. 11A is an image of a remote computer that can be used to manually transferring data from the integrated instrument package.
Figure 11B:
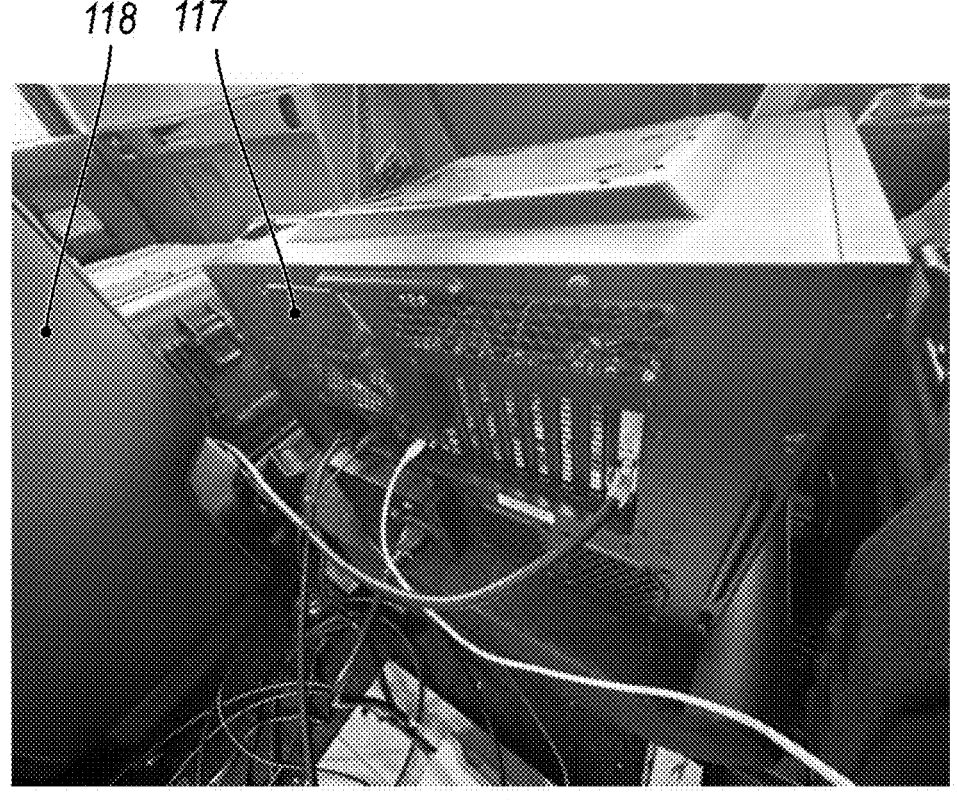
FIG. 11B is an image of an onboard computer system, with connections to the controller, for use as a data acquisition and control device.

Applications on this computer may be used to monitor data collection in real-time and alert the operator in case of signal loss. The removable onboard computer (1110) can be seen in FIG. 11A. The data acquisition and control device (117), positioned within the vehicle connected to various other components, can be seen in FIG. 11B.

Figure 12:
FIG. 12 is an image of an onboard monitor showing captured camera images.

A screen (a keyboard may also be present), allowing system monitoring via, e.g., various purpose-built applications, may be present in the vehicle, and may be mounted to the vehicle. FIG. 12 shows various user interfaces (including graphical user interfaces) for monitoring of camera images, and control of camera settings. In particular, FIG. 12 shows four windows, one for each camera being monitored (2 left side cameras, 2 right side cameras). For each window, there is a first icon (1210) showing for monitoring the images/video (1211), and a second icon (1212) for accessing various settings.

Figure 13:
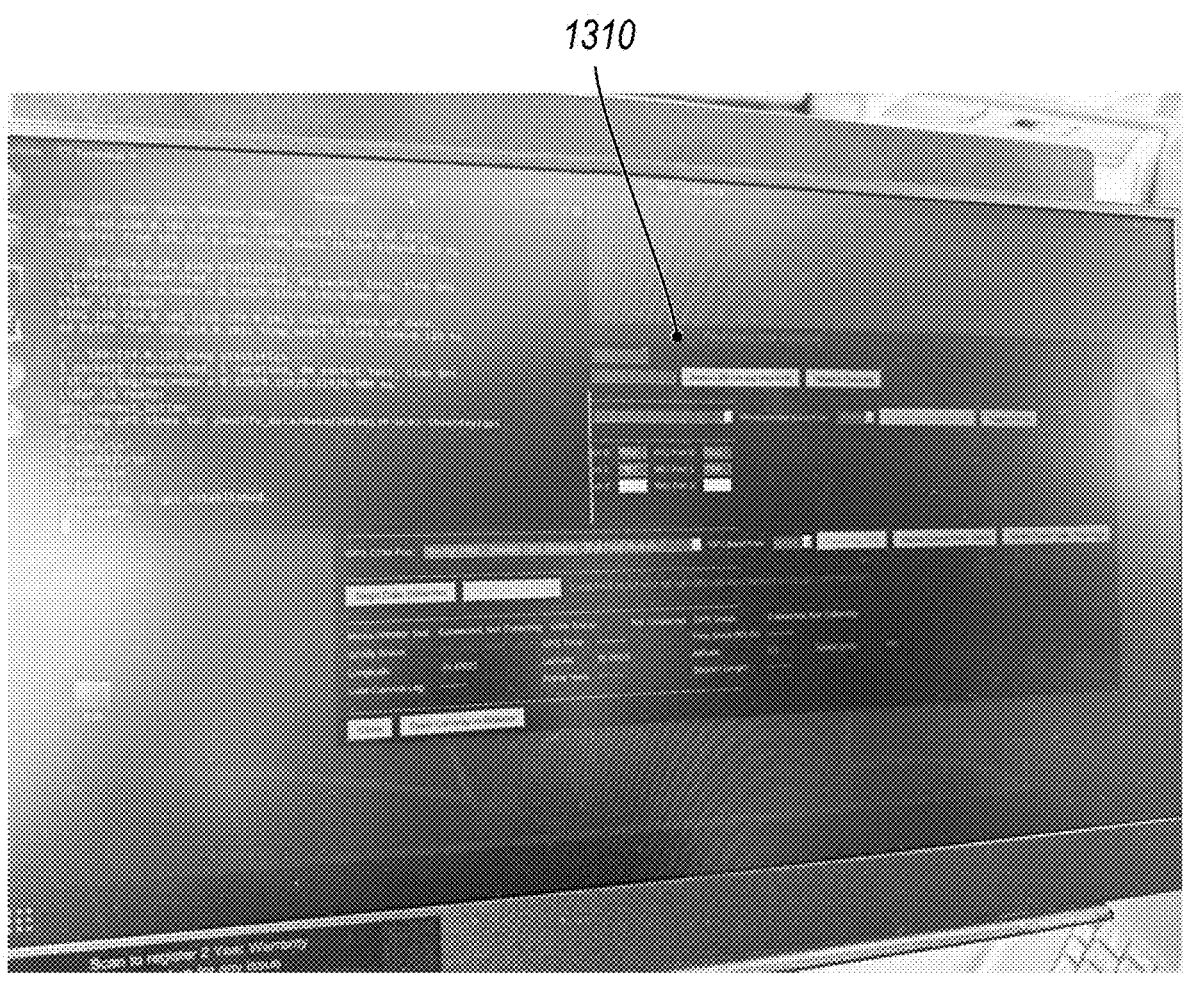
FIG. 13 is an image of an onboard monitor showing data acquisition status.

FIG. 13 shows user interfaces (such as graphical user interfaces) for monitoring the status of data acquisition. A first window (1310) provides a display of the relevant status of the various data being collected, including, e.g., GPS connectivity, times, location coordinates, ports associated with different data streams (e.g., port 1 for GPS data, port 2 for camera 1 data, etc.) The window may include stop and/or start buttons for collecting data.

In some embodiments, at the end of each data collection period, the two mounting plates each with two cameras and one lidar transceiver may be removed for secure storage, and/or the removable onboard computer may be removed. The data collection period may be, e.g., less than 10 minutes, 10-30 minutes, 30 minutes-2 hours, 2-8 hours, 8-24 hours, or more than 24 hours.

In some embodiments, the removable onboard computer may be used to receive video data from each of the four video cameras. In some embodiments, the received video may then be compressed for reduced data storage volume. In some embodiments, the compressed video data, lidar data, and GPS data are transferred to a removable storage device for transport to, e.g., an office location.

In some embodiments, the captured data may be transferred to the components related primarily to data processing (120). In some embodiments, the components related primarily to data processing may include pre-processing components (130) and/or processing components (140). In some embodiments, these components may be in the same geographic location (e.g., same building), In some embodiments, these components may be in the different geographic locations (e.g., the pre-processing may be done in an office building, while the processing may be done using a cloud-based server).

The data may be sent to the pre-processing components (130), which may include one or more remote processors (131), which may be coupled to memory (132), a non-transitory computer readable storage device (133), and one or more I/O components (134).

This transfer may be done wired or wirelessly. In some embodiments, this may be done in batches (such as after the end of each data collection period). In some embodiments, this may be done at least partially while the data collection period is ongoing.

In some embodiments, the components related primarily to data processing may include pre-processing components and/or processing components.

In some embodiments, the pre-processing components may include error checking and packaging of the data. For example, in some embodiments, a portable data storage device containing data from the vehicle-mounted components may be received in an office location where the device is checked for readability, i.e., to confirm the data was not corrupted in transit. The data is then pre-processed using at least one processor, whereby the video data is processed into individual frames or images and metadata is attached to each frame including: (i) Time and date stamp; (ii) GPS attitude (heading, roll, pitch) (iii) GPS Location (latitude, longitude, altitude) (iv) Vehicle speed; and (v) Estimated GPS positional accuracy. In some embodiments, this processor in an office location may be configured to determine vehicle speed based on the GPS data. In some embodiments, the vehicle speed is provided in the data from the vehicle-mounted components.

In some embodiments, Data from the data storage device is connected to a high speed network and the data is uploaded into data storage at an internet cloud storage provider.

If processing is done on a different processor from the pre-processing, the pre-processed data may be sent to the processing components (140), which may include one or more remote processors (141), which may be coupled to memory (142), a non-transitory computer readable storage device (143), and one or more I/O components (144).

In some embodiments, the processing components may include an internet cloud-based storage system, such as an Amazon Simple Storage Service (Amazon S3) storage system.

The non-transitory computer-readable storage device may contain instructions that, when executed by the one or more processors, causes the one or more processors to perform specific steps.

Referring to FIG. 2, a flowchart of an example method (200) may be seen, showing some specific steps that may be performed by the system.

The method may include receiving (205) multiple-view and synchronized video images, which later may be converted to still images, lidar images and data, and 3D (latitude, longitude, and elevation) GPS data from a moving vehicle on a roadway.

In some embodiments, as disclosed herein, two high resolution video cameras and one lidar transceiver may be mounted on the vehicle roof right-facing at 90 degrees to the direction of travel. In some embodiments, as disclosed herein, an additional two high resolution video cameras and one lidar transceiver are mounted on the vehicle roof left-facing at 90 degrees relative to the vehicle's heading. In some embodiments, as disclosed herein, two roof-mounted GPS antennae receive GPS signals. In some embodiments, as disclosed herein, an onboard GPS with inertial measurement unit, connected to the roof-mount GPS antennae, and at a fixed height and orientation above the roadway gathers precise GPS data including spatial coordinates of latitude, longitude, and elevation in relation to the data.

In some embodiments, a processor (e.g., a portable computer) receives the lidar and GPS data via a high-speed network connection and records it to a storage device.

In some embodiments, a tri-level sync distribution amplifier may be provided that receives a clock signal from one of the cameras designated as the master that repeats the clock signal to each of the other cameras and synchronization processor allowing frame-level synchronization of all sensors.

In some embodiments, a processor that receives a clock signal from the tri-level sync distribution amplifier may be provided that: repeats the clock signal to the lidar sensor to start a frame scan synchronized with the cameras; repeats the clock signal to the portable computer to record the current time from the GPS data stream; and turns on the record function on all video cameras simultaneously when directed by the portable computer.

In some embodiments, a monitor and keyboard may be used to monitor the status of devices and the data streams, and the camera views, and may be used to adjust camera settings from inside the vehicle.

Figure 14A:
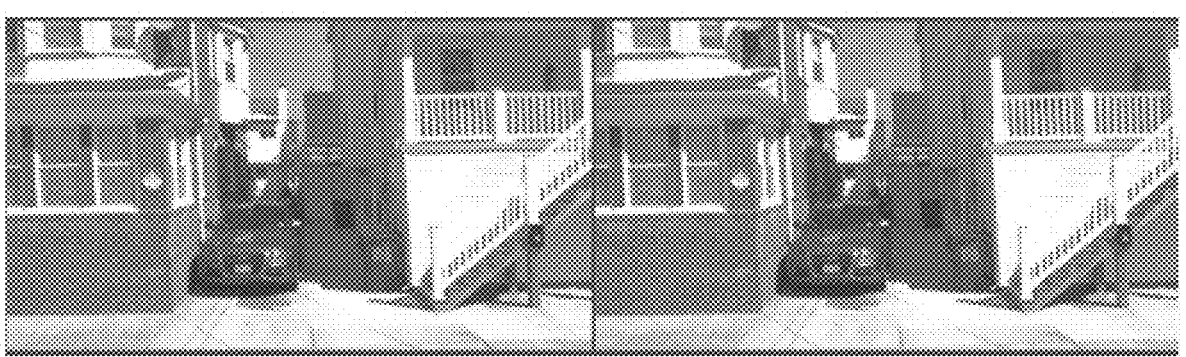
FIG. 14A is an image of a pair of still image frames from two video cameras facing one side of the vehicle.
Figure 14B:
FIG. 14B is an image showing a LiDAR scan of the scene in FIG. 14A synchronized with the still image frames.

Referring briefly to FIGS. 14A-14B, FIG. 14A shows a pair of video frame images captured from video cameras on one side of a vehicle, and FIG. 14B shows a LiDAR scan of the scene captured simultaneously with the video frame images.

The method may include comparing (210) the video frames and still images from two or more video cameras of the plurality of video cameras mounted at the same relative elevation and oriented to produce parallel views creating a stereoscopic effect. This may also include inferring depth of field from parallax.

The method may include aligning (220) the lidar point cloud frames and images with a spatially and temporally consistent image and video frame. For example, the processor(s) can determine a data point in the lidar point cloud frames and images that best aligns with a given pixel in a still image or video frame, for every pixel in the still image or video frame.

Figure 15:
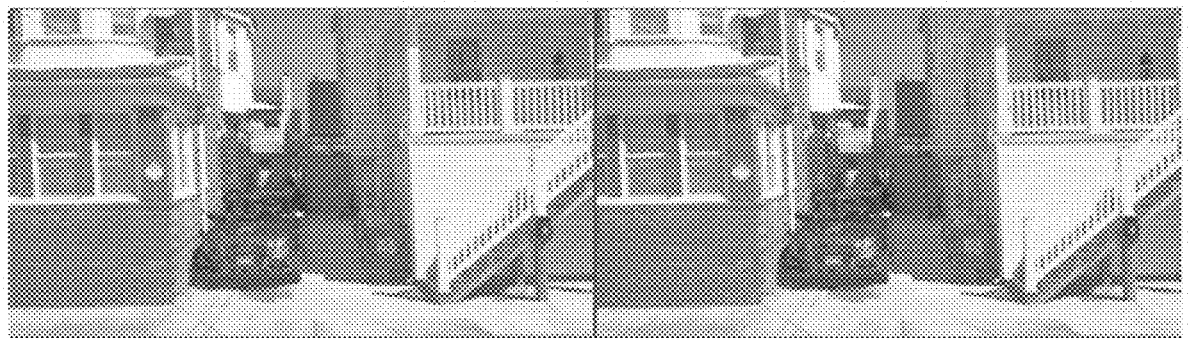
FIG. 15 shows images of the still video frame from the two video cameras in FIG. 14A aligned and merged with the synchronized LiDAR scan in FIG. 14B.

Referring briefly to FIG. 15, the still images produced from the captured video (of FIG. 14A), aligned and merged with the LiDAR scan (of FIG. 14B), can be seen.

The method may include associating (230) the GPS position readings with corresponding lidar point cloud frames and images.

In some embodiments, video data from each camera may be converted into an image sequence. In some embodiments, each camera may produce M images or frames per second (e.g., M=10, 15, 30, 60, 120, etc.). In some embodiments, every i-th image (e.g., every image, every third image, etc.) in a sequence, may be stored with metadata that includes the time from the GPS and GPS coordinates including latitude, longitude, and elevation relative to a datum at the time the image was taken.

In some embodiments, lidar data from each lidar transceiver is converted into a series of three-dimensional (e.g., X, Y, Z) point cloud data sets, hereinafter referred to as lidar scans. Each lidar transceiver generates N scans per second. In some embodiments, every j-th scan is stored with metadata that includes the time from the GPS and GPS coordinates including latitude, longitude, and elevation relative to a datum at the time the scan occurred.

In preferred embodiments, i and j are selected such that M/i=N/j. That is, if the cameras capture 30 frames per second where every third image (i=3) is stored with metadata, if the lidar transceiver captures 10 scans per second, every scan (j=1) should be stored with metadata, since 30/3=10/1.

The method may include assigning (240) relative-position 3-dimensional coordinates to every pixel in at least one of the still images (note, each video frame can be considered and/or transformed into a still image). In some embodiments, only a single still image is utilized. In some embodiments, all images used are taken from substantially the same perspective (e.g., all images are "front" views of a building as seen from a same general point on a roadway). In some embodiments, the method does not utilize images of the rear of the building (e.g., the side of the building facing away from the closest roadway). In some embodiments, at least two sides of a building are visible in the image (e.g., a front side and a right or left side of the building).

Figure 16:
FIG. 16 is an image of video frames merged with a LiDAR scan, and with metadata.

In some embodiments, as seen in FIG. 16, one or more processor(s) may be configured to, individually or collectively, superimpose an X-Y (left/right—up/down) visual depiction of the lidar scan on top of the images from the two cameras on the same side of the apparatus as the lidar transceiver where each camera image and lidar scan share the same timestamp. In some embodiments, the processor(s) may be configured to allow for adjustable parameters to correct temporal misalignment in initial camera/lidar timestamp caused by non-simultaneous start times of the sensors recording functions. In some embodiments, the processor(s) may be configured to calibrate and rectify the stereo cameras such that any object or feature in the left image is located on the same pixel row in the other image. In some embodiments, the processor(s) may be configured to calibrate the LiDAR point cloud with both cameras such that the visual depiction of the LiDAR superimposed on the image matches objects within the image. In some embodiments, the processor(s) may be configured to calibrate corrections to rolling shutter-based errors caused by vehicle motion while the LiDAR sensor rotates its scanner. Typically, calibrations of the sensors and rolling shutter are performed by a human once, and these parameters do not change from one day to another. Temporal misalignment correction may be done by a human once for each segment of data from continuous operation of the equipment, for example data from a period of several hours of operations while driving.

Once the lidar data superimposed on the image matches objects within the image, the 3-dimensional coordinates, relative to the LiDAR transceiver unit for the cameras used to capture the image, can be determined for every pixel in the image.

The method may include transforming (250) the relative-position 3-dimensional coordinates for every pixel into 3-dimensional coordinates referenced to GPS coordinates and one or more vertical elevation datums.

Prior to gathering data, the method may include establishing multiple ground control points (GCPs) with targets visible to the cameras, measuring those with a stationary and independent GPS, and saving LiDAR X, Y, Z and vehicle-mounted GPS position and orientation at image frames images where targets are visible.

Figure 17A:
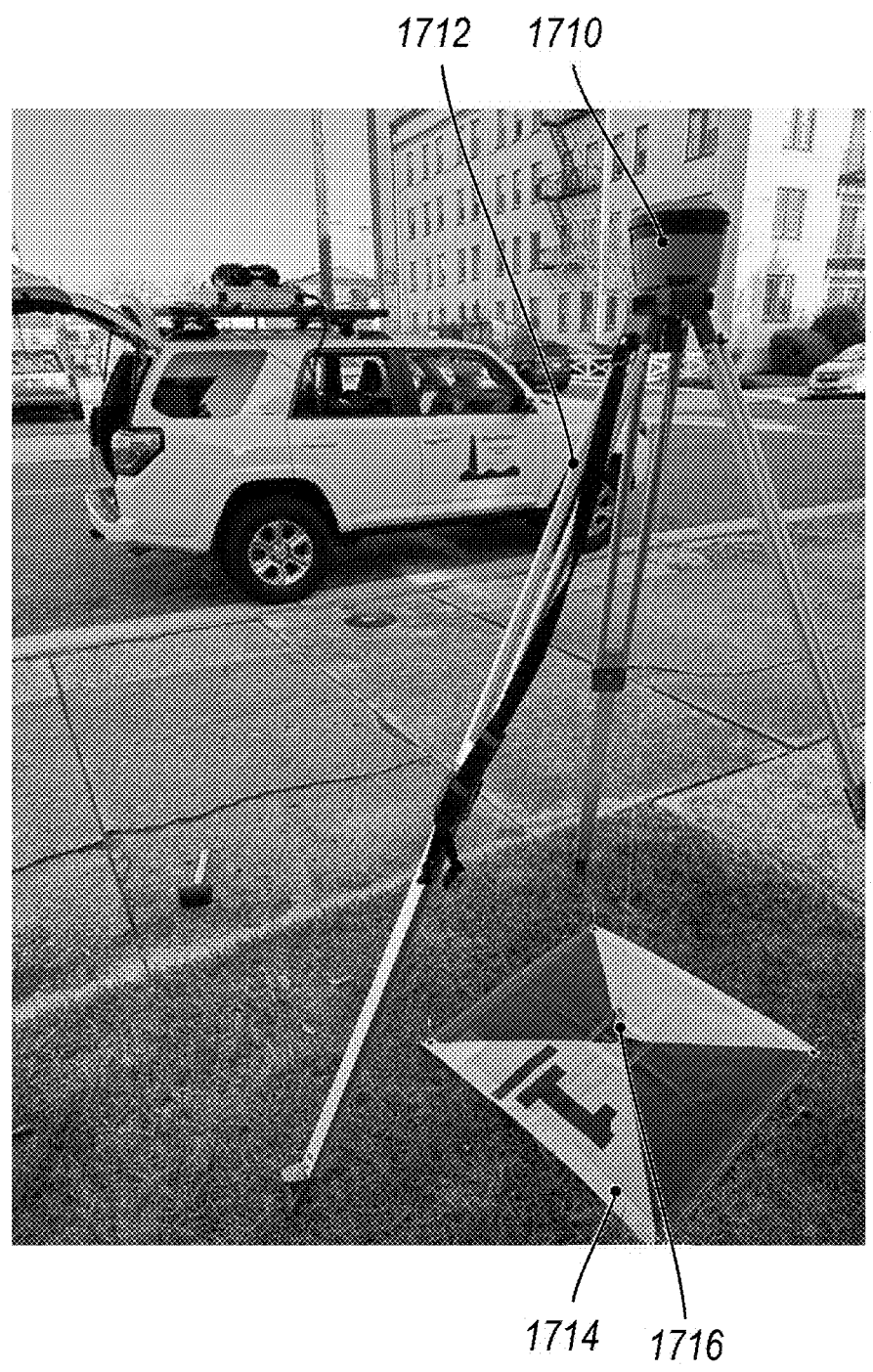
FIGS. 17A and 17B are images of a ground control point (GCP) with portable GPS, with plumb line.
Figure 17B:

Referring to FIGS. 17A and 17B, a plurality of numbered targets visible to the cameras and LiDAR transceivers may be positioned on the ground. Absolute 3-dimensional coordinates of each target (1714) (here, numbered squares with a black and white pattern on them), the coordinates consisting of latitude, longitude, and elevation relative to a datum are measured using a precision stationary GPS (1710) mounted on a tripod (1712) with a plumb with plumb bob (1716) of fixed length and recorded.

In some embodiments, a person in the vehicle (e.g., driver, passenger, etc.) may use a trigger (e.g., a wireless bluetooth remote trigger) when passing the GCPs to signal the data collection software to record the current time in a separate file.

Figure 18:
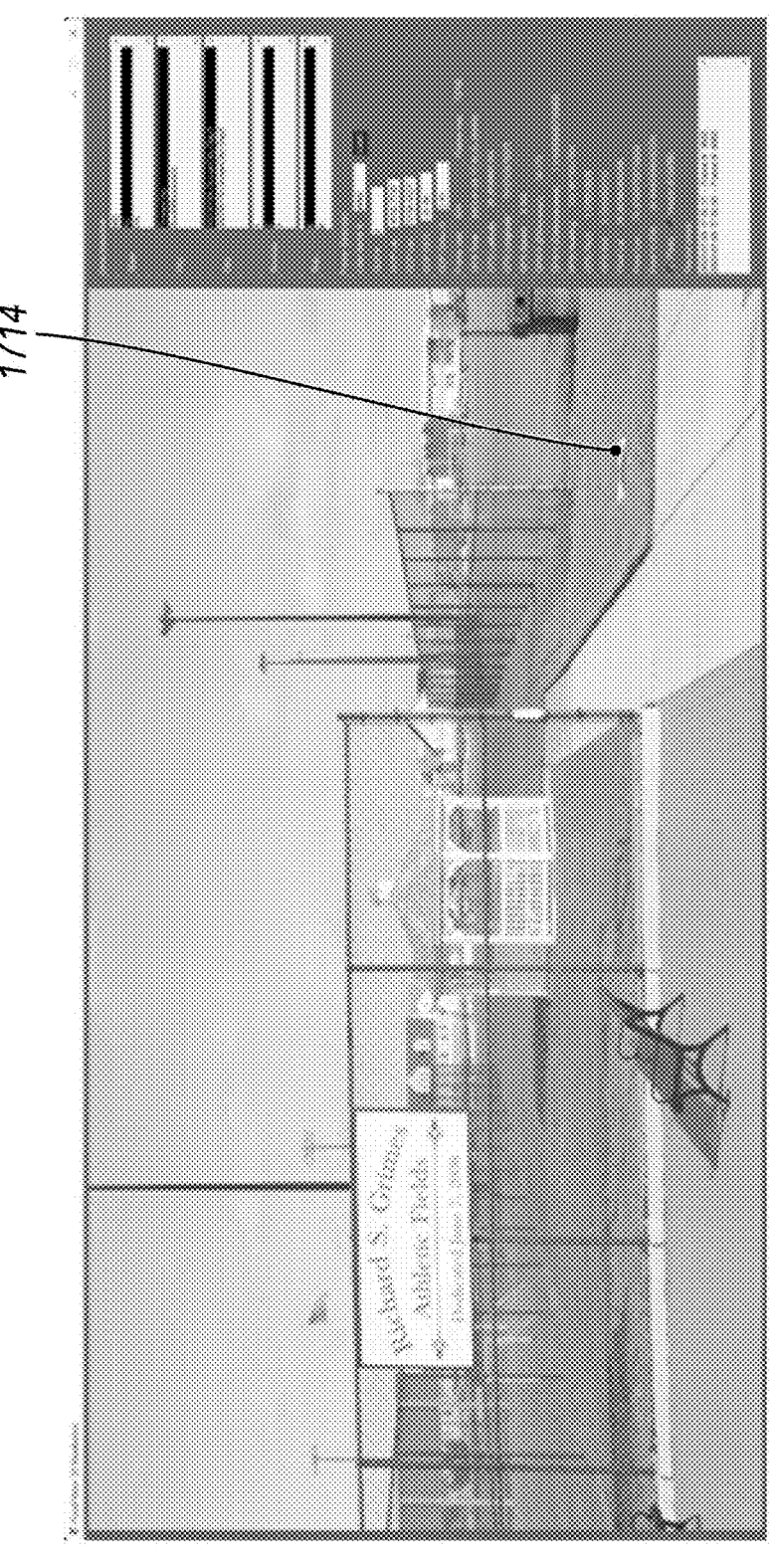
FIG. 18 is an image of a video frame with a GCP target.

A processor may be configured to load an image and its corresponding point cloud selected by driving session and frame number, e.g., as entered by a user. As seen in FIG. 18, the processor may be configured to suggest times and frame numbers that GCPs are visible (see, e.g., target (1714)), as recorded by the aforesaid remote trigger during data collection. The GCP number may be entered, and its aforesaid latitude, longitude, and elevation measurements. The target within the image is selected, and the processor may then be configured to allow copying relevant measurements, including point cloud X, Y, and Z distances, as well as GPS measurements (latitude, longitude, altitude, heading, pitch, and roll), into a database (including, e.g., a spreadsheet). The next frame number may be loaded, and the process may be repeated until the GCP is no longer visible in the image.

This step may also include solving boresight angles and lever arm between cameras and GPS inertial measurement unit (IMU) and transforming the aforesaid relative $X_R$, $Y_R$, and $Z_R$ coordinates of each lidar pixel into absolute coordinates of latitude $(X_A)$, longitude$(Y_A)$, and elevation$(Z_A)$ relative to a geodetic datum(s).

Initially, the X, Y, and Z coordinates for each scan pixel from each lidar transceiver are relative to the lidar transceiver, which is a different coordinate system than the world coordinate system (latitude, longitude, and altitude). These X, Y, and Z coordinates are first transformed to coordinates U, V, and W relative to the GPS receiver, which requires solving the three boresight angles (difference in orientation) between the LiDAR sensor and the GPS receiver's inertial measurement unit (IMU), as well as the lever arm (physical distance in 3-dimensions) between the LiDAR sensor and IMU. The GPS-measured position and attitude are then used to transform the coordinates U, V, and W to latitude, longitude, and altitude. Using the aforesaid GCP measurements saved to a database as ground truth, a parameter grid search is used to find the boresight angles and lever arm such that the root mean squared error between computed world position and true world position of each GCP is minimized.

The method may include using (260) a neural network to identify an object and/or environmental feature in the at least one of the still images and infer a GPS position and elevation of the object and/or feature.

In some embodiments, a processor may be configured to operate a neural network (NN), such as a convolutional neural network (CNN), employed to identify objects in an image. Such neural networks, and the methods for training such networks, are known in the art, and an appropriate neural network may be utilized for this step.

In one embodiment, the neural network is used to identify the bottom of a building entry door and/or bottom of a garage door. The bottom of entry doors on the first floor may be used as a proxy for first floor elevation, FFE. The bottom of garage doors may be used as a proxy for the garage floor or slab.

Figure 19:
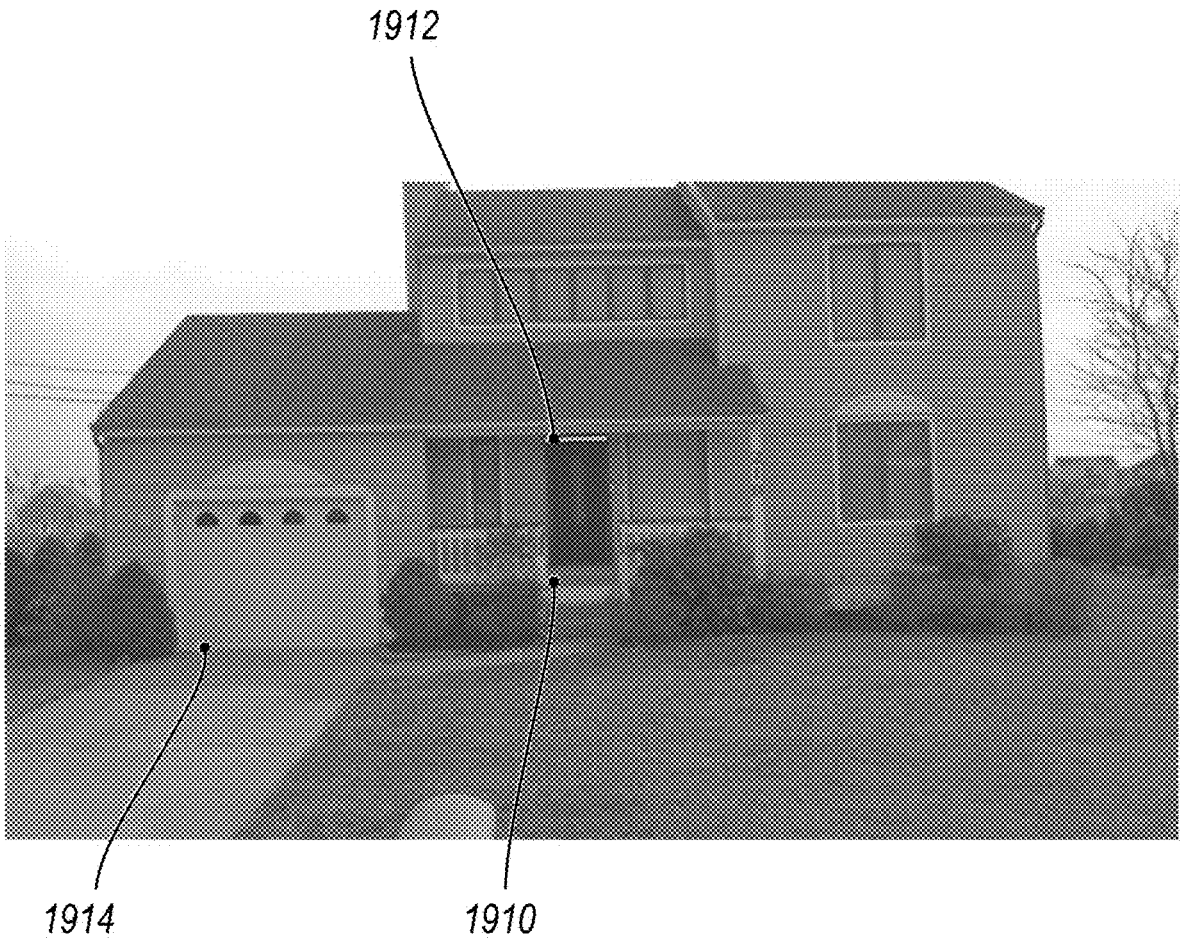
FIG. 19 is an image showing a neural network detection of the bottom (blue) and top (green) of entry doors, and bottom (red) of garage doors.

As seen in FIG. 19, in one example, a NN is shown as having detected a bottom (1910) of an entry door by highlighting it in a first color (e.g., blue) and a top (1912) of the entry door by highlighting it in a second color (e.g., green), and a bottom (1914) of a garage door by highlighting it in a third color (e.g., red).

Those of skill in the art will recognize that application of a neural network to identify the bottoms of entry doors and garage doors is not limited to those objects. Such networks may also be generalized to identify any object for which the NN is trained including a building's lowest adjacent grade, highest adjacent grade, the bottom of machinery or equipment that services the building, lowest adjacent grade at lowest elevation of deck or stairs, including structural support, and other elements found on a FEMA elevation certificate as required by the National Flood Insurance Program.

It may also be generalized to find loading docks critical to supply chain operations, infrastructure such as electrical, telecommunications, HVAC equipment, vehicles, storm drains, and/or fire hydrants.

The processor may be configured to (i) automatically find images with visible doors, (ii) label garage and front door edges, and (iii) use high-density lidar point clouds and GPS measurements the processor(s) have previously determined for the image to estimate, e.g., finished floor elevations.

In some embodiments, the method may include using a neural network to estimate a complete 3D reconstructed X, Y, and Z map for any image.

Figure 20A:
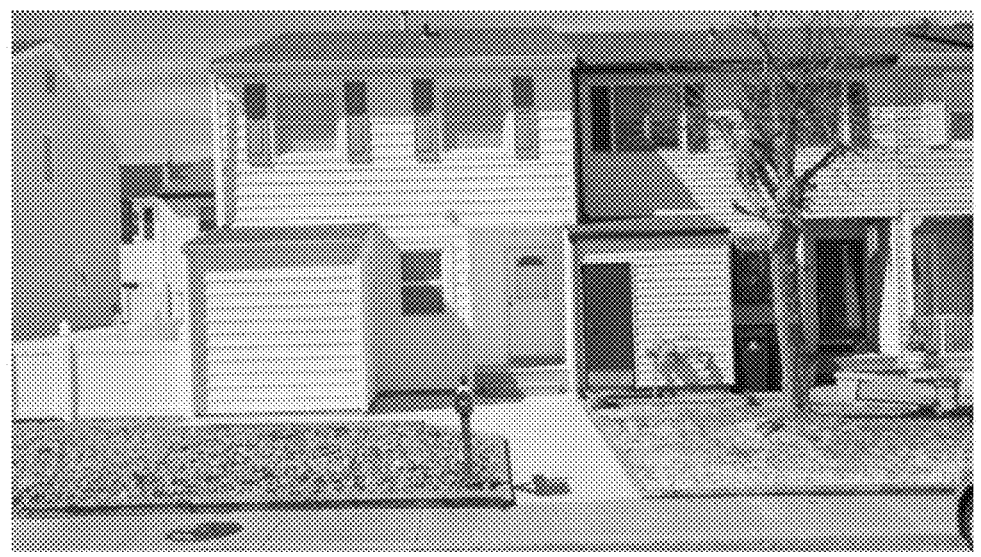
FIG. 20A is an image showing a captured image before 3D reconstruction.
Figure 20B:
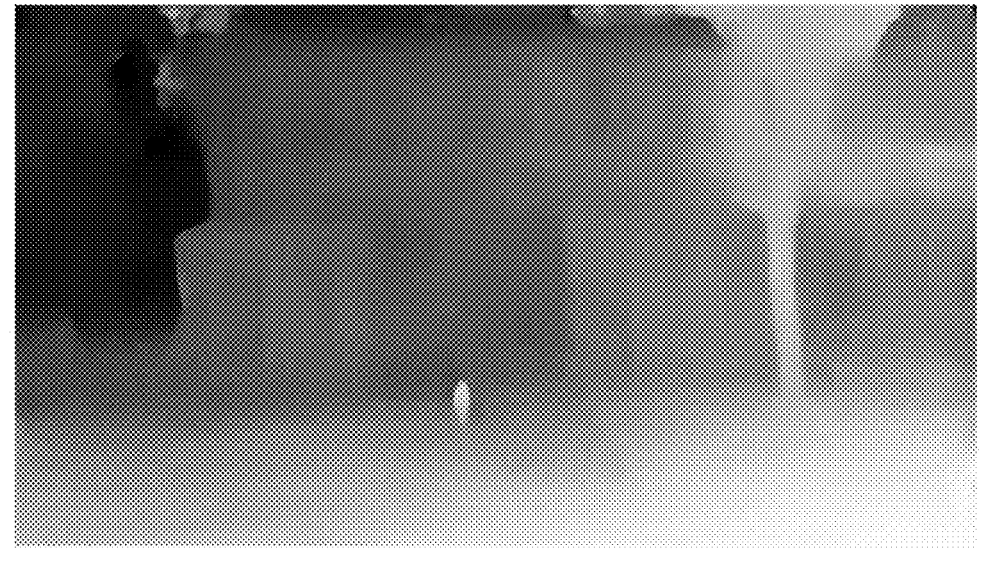
FIG. 20B is an image showing a reconstructed depth map of the image in FIG. 20A.
Figure 21A:
FIGS. 21A and 21B are images showing a scene with (21A) and without (21B) a simulated water surface.
Figure 21B:
Figure 22A:
FIGS. 22A and 22B are images showing a scene with (22A) and without (22B) a simulated water surface.
Figure 22B:
Figure 23A:
FIGS. 23A and 23B are images showing a scene with (23A) and without (23B) a simulated water surface.
Figure 23B:
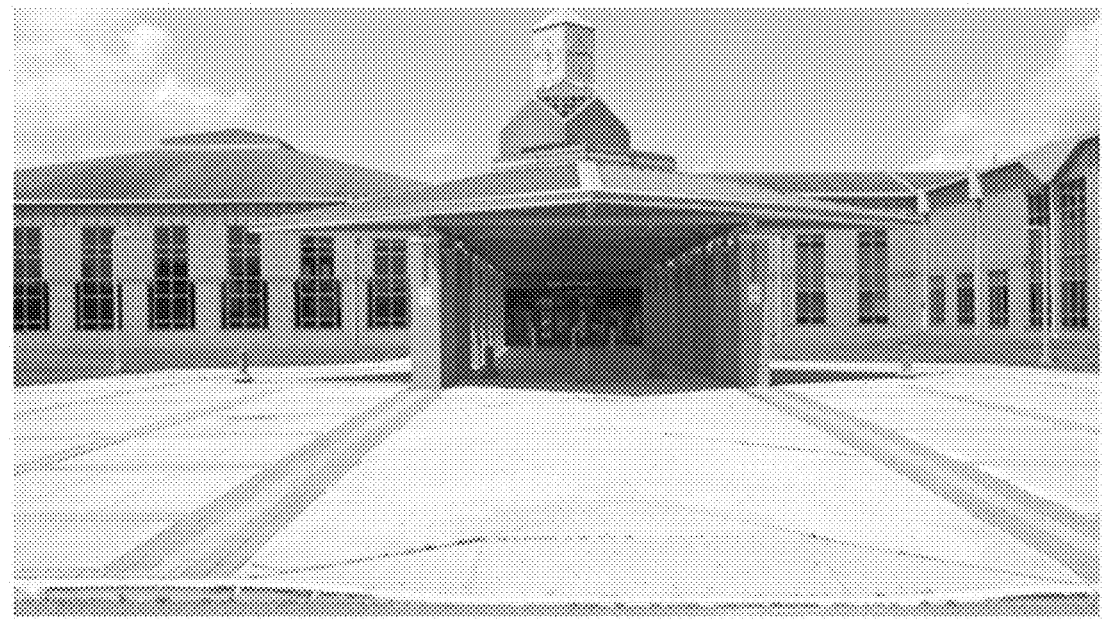
Figure 24A:
FIGS. 24A and 24B are images showing a scene with (24A) and without (24B) a simulated water surface.
Figure 24B:

A lidar point cloud does not inherently cover every pixel of an image captured by a video camera, and there may be significant gaps between pixels. In some embodiment, a NN (such as a CNN) may be used to fuse stereo imagery with the corresponding point cloud to estimate disparity in each pixel within the image (the difference in column position of an object between the left and right cameras). Given stereo parameters computed as disclosed herein, disparity is converted to depth (distance from the camera) and finally X, Y, and Z coordinates. Using the boresight angles and lever arm parameters computed as disclosed herein, each pixel may be converted to latitude, longitude, and altitude coordinates. FIG. 20A shows an image before reconstruction, and FIG. 20B shows a completed reconstructed depth map of the image.

In some embodiments, the method may include determining (270) an elevation of a forecasted or modeled water surface, and determining if each pixel in an image is above or below the forecasted or modeled water surface according to its X, Y, and Z coordinates (such as its $X_A$, $Y_A$, and $Z_A$ coordinates).

Scientifically rigorous water and flood models and forecasts are dependent on location typically specified by latitude and longitude. Employing the latitude $(X_A)$ and longitude$(Y_A)$ determined using the disclosed method, the location-specific height of a modelled or forecast water or flood elevation can be determined. Using this water or flood height, every pixel can be assessed as to whether the elevation $(Z_A)$ of the pixel is above or below the forecast or modelled water level.

As will be understood, such models for determining water or flood elevations or forecasting such measurements are well understood in the art, and any appropriate known model could be utilized. Indeed, in some embodiments, rather than determining an elevation, an external model could simply provide such elevations. For example, in some embodiments, the method may include receiving information from an external model, defining water surface elevations. Here, "external model" refers to stand alone models, that typically can be run separately from the disclosed devices, systems, and methods. For example, a tropical cyclone model may be created and run separately to predict flood elevations in a given area of land. The predictions from such a model can be provided to the disclosed devices, systems, and methods, that can use that provided information to, e.g., create accurate visual representations. In some embodiments, the method may include receiving information from a plurality of external models.

In some embodiments, the method may include determining (272) whether an identified object is inundated, partially inundated, or not inundated by the modelled water surface, based on information related to the pixels associated with the identified objects.

As disclosed herein, the method may determine pixels associated with a visible object of interest (e.g., door, window, ground feature, etc.). The method may include comparing the elevation ($Z_A$) of objects to the elevation ($Z_A$) of a modelled or forecast water surface, and based on the comparison of one or more pixels, providing an indication of whether the pixels of an object are above, at, or below the surface of the modelled or forecast water surface. For example, in some embodiments, the method may include first determining if the bottom of the object is below the water surface (if not, the object is not inundated), and if so, then determining if the top of the object is below the water surface (if so, the object is fully inundated, and if not, the object is partially inundated).

In some embodiments, the method may include producing (274) a photo-realistic image (and/or video) with water fit to and around objects in the image according to a target elevation (e.g. elevation $Z_A$), using a neural network(s) to fit a synthetic water surface with realistic attributes including color, opacity, wind effects, and surface effects such as waves, splashes, and ripples and having $X_A$, $Y_A$, and $Z_A$ coordinates to the built environment image where each pixel has $X_A$, $Y_A$, and $Z_A$ coordinates.

After it is determined whether (or which) pixels have elevations ($Z_A$) at or below a water level, a NN, such as a state-of-the-art Generative Adversarial Network (GAN), is used to fit a simulated water surface to the combined visual image/lidar/GPS measurements at each pixel with $X_A$, $Y_A$, and $Z_A$ coordinates where the elevation $Z_A$ is at or below the elevation of the simulated water surface. Examples of such generated scenes can be seen in FIGS. 21A-24B, where the pairs of images include the scene with a simulated water surface (FIG. 21A, FIG. 22A, FIG. 23A, FIG. 24A) and the scene without the simulated water surface (FIG. 21B, FIG. 22B, FIG. 23B, FIG. 24B). GANs for generating images are well understood in the art, and any appropriate GAN may be utilized.

Realistic effects including color, opacity or transparency, wind, and surface disturbances such as waves, splashes, and ripples may be applied to the water surface so as to generate a photorealistic image for a single photograph or frame, or to a series of frames for a video.

In some embodiments, a GAN may be used to take any one of these combined visual image/lidar/GPS measurements to render a highly realistic 3D water surface at any specified depth.

Thus, the disclosed approach can be used to model flood levels in relation to homes, buildings, and/or landmarks.

As will be understood, because the captured images contain absolute GPS and elevation data, the images can be combined to capture geographic areas of different sizes.

In some embodiments, this method may be used to provide modelled elevation data for FFE for individual property, properties on a street, properties in a neighborhood, zip code, or community. In some embodiments, the method may be used to produce photo-realistic flood images for multiple modelled water levels for each individual property, properties on a street, properties in a neighborhood, zip code, or community.

For example, pixels with $X_A$, $Y_A$, and $Z_A$ coordinates associated with the bottom of an entry door are processed for the elevation $Z_A$ mean, minimum and maximum. Depending on the use case, elevation $Z_A$ mean, minimum, or maximum is assigned as the first-floor elevation of the building. The system allows this FFE capability to be assigned to any building with a entry door on a street, in a neighborhood, zip code, or community.

In the same manner, pixels with $X_A$, $Y_A$, and $Z_A$ coordinates associated with the bottom of a garage door are processed for the elevation $Z_A$ mean, minimum and maximum. Depending on the use case, elevation $Z_A$ mean, minimum, or maximum is assigned as the garage slab elevation of the building. The system allows this garage slab elevation capability to be assigned to any building with an entry door on a street, in a neighborhood, zip code, or community.

In some embodiments, this method may be extended to determine other building elevation attributes as specified on a FEMA National Flood Insurance Program elevation certificate. In some embodiments, the processor(s) may be configured to identify one or more objects in the image that can be used to determine an elevation of a top of a bottom floor (including basement, crawlspace, or enclosure floor), a top of the next higher floor, a bottom of the lowest horizontal structural member, an attached garage (top of slab or floor), a lowest elevation of machinery or equipment servicing the building (and identify the machinery or equipment), a top of a platform of machinery or equipment servicing the building, a lowest adjacent (finished) grade next to building (LAG), a highest adjacent (finished) grade next to building (HAG), a lowest adjacent grade at lowest elevation of deck or stairs, including structural support, and/or flood openings in an attached garage.

For example, in some embodiments, the neural network may first identify an object and/or environmental feature. The processor(s) may then determine a class or category of the object or feature (e.g., a vehicle, sporting equipment, furniture, etc.). The processor(s) may then take specific additional actions based on the determined class or category. As one example, if the class or category is a machinery or equipment that services a building, the processor(s) may perform certain additional tasks. The processor(s) may optionally determine a distance between the machinery or equipment and the building. If the distance is less than a predetermined distance or within a predetermined range (which may vary by machinery or equipment), the machinery or equipment may be determined to be associated with the building. For example, if an image includes an air conditioning unit, but the unit is determined to be 100 feet away from the building, it is unlikely to be associated with the building, as opposed to if it were 10 feet away or less. If the machinery or equipment is determined to be associated with the building, the processor(s) may be configured to determine the lowest elevation of that machinery or equipment using the methods disclosed herein.

The processor(s) may be configured to identify a feature in the image for use as a proxy to a non-visible feature. For example, the bottom of an entry door may be used as an elevation of a first floor (e.g., top surface of a finished first floor), the bottom of a garage door may be used as a proxy for the elevation of a garage slab (e.g., the top surface of the garage slab), etc.

The processor(s) may be configured to determine elevations of a critical infrastructure component. For example, if the processor(s) identify an item as a critical infrastructure component, the processor may be configured to determine an elevation (such as the lowest elevation) of that machinery or equipment using the methods disclosed herein, Non-limiting examples of critical infrastructure components include, e.g., electrical components, telecommunications components, HVAC equipment, generators, vehicles, storm drains, gas meters, and fire hydrants. Critical infrastructure components may include, e.g., components critical to supply chain operations, such as loading docks.

The processor(s) may be configured to associate the building with a street address based on the 3-dimensional coordinates referenced to GPS coordinates and one or more vertical elevation datums. For example, if a front door is identified, the processor(s) can identify the pixels associated with that front door. The identified pixels have GPS coordinates associated with them. In some embodiments, the processor(s) may be configured to identify a target location by using an average of the GPS coordinates associated with the building. In some embodiments, the processor(s) may be configured to identify a pixel representing a predetermined portion of the door (e.g., a center of mass, a bottom left corner, etc.), and the GPS coordinates associated with that pixel may be associated with the building. The processor(s) may then use those GPS coordinates, and determine the closest street address, using data from an address database (such databases are known in the art, and may include, e.g., the national address database, etc.) The closest street address can then be associated with the building.

The processor(s) may be configured to transform data from the lidar point cloud frames and/or images and spatially and temporally consistent image and/or video frame into a format adapted for use in automatically filling out a plurality of fields on a FEMA National Flood Insurance Program Elevation Certificate. For example, the data from the images may be stored in a structured database. In this manner, by referencing information in the structured database, an elevation certificate can be at least partially completed by the one or more processor(s).

In some embodiments, the method may include combining FFE data and photo-realistic flood images with other location-specific data such as property ownership, map location, address, values, and land use. That is, image and data assets created with the disclosed system and methods are combined with other location specific data including property dimensions, market and tax values, ownership, land use.

In various aspects, after transforming (250) the relative-position 3-dimensional coordinates for every pixel into 3-dimensional coordinates referenced to GPS coordinates and one or more vertical elevation datums, and/or after producing (274) a photo-realistic image and/or video with water fit to and around objects in the image, it may be useful to create a data package that includes both visual images/video and data tables. The data package may be provided on a non-transitory computer-readable storage device. Specifically, the data package may include the images and/or video frame that was used when transforming the relative coordinates of each pixel into absolute coordinates. The data package may include the photo-realistic image and/or video with water fit to and around objects in the image. The data package may include output of a measurement and/or a modeled flood level as metadata in the images and/or video frame, and/or the photo-realistic image and/or video with water fit into and around objects in the image. The data package may include a database including one or more addresses and/or latitude and longitudes related to the image (s) and/or video(s). The database may include one or more measurements and/or modeled flood levels related to the image(s) and/or video(s).

In certain aspects, a technique may include receiving the data package, and automatically inputting the data package into a geospatial analytics mapping models or software, then utilizing the information from the data package to generate an updated analysis. The improved data is expected to provide a more accurate analysis than previously possible (e.g., versus using only available satellite data for elevations).

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A three-dimensional (3D) measurement and image system, comprising:

one or more processors coupled to one or more non-transitory computer-readable storage devices, the one or more non-transitory computer-readable storage devices containing instructions that, when executed, configure the one or more processors to, collectively:

receive still images and/or video frames, light detection and ranging (LiDAR) point cloud frames and/or images, and global position system (GPS) position readings;

align the LiDAR point cloud frames and/or images with a spatially and temporally consistent still image and/or video frame;

associate the GPS position readings with corresponding LiDAR point cloud frames and/or images;

assign relative-position 3-dimensional coordinates, relative to a position of a LiDAR sensor, to every pixel in the spatially and temporally consistent still image and/or video frame;

transform the relative-position 3-dimensional coordinates for every pixel into 3-dimensional coordinates referenced to GPS coordinates and one or more vertical elevation datums;

use a neural network to identify an object and/or environmental feature in the spatially and temporally consistent still image and/or video frame and infer a GPS position and elevation of the object and/or environmental feature based on the 3-dimensional coordinates referenced to GPS coordinates and one or more vertical elevation datums for pixels representing the object and/or environmental feature; and determine a first-floor elevation of a building and/or elevation of attached garage slab or floor based on the elevation of the object and/or environmental feature.

2. The three-dimensional (3D) measurement and image system according to claim 1, wherein the object and/or environmental feature is a door or a grade adjacent to a building foundation.

3. The three-dimensional (3D) measurement and image system according to claim 1, wherein the one or more processors are further configured to associate the building with a street address based on the 3-dimensional coordinates referenced to GPS coordinates and one or more vertical elevation datums.

4. The three-dimensional (3D) measurement and image system according to claim 1, wherein the one or more processors are further configured to transform data from the LiDAR point cloud frames and/or images and spatially and temporally consistent still image and/or video frame into a format adapted for use in automatically filling out a plurality of fields on a FEMA National Flood Insurance Program Elevation Certificate.

5. The three-dimensional (3D) measurement and image system according to claim 1, wherein the one or more processors are further configured to determine the elevation of a top of a bottom floor, a top of a next higher floor, a lowest adjacent grade next to the building, highest adjacent grade next to the building, and/or the lowest adjacent grade at a lowest elevation of a deck or stairs.

6. The three-dimensional (3D) measurement and image system according to claim 1, wherein the neural network identifies machinery or equipment next to a building, and the one or more processors are further configured to determine a lowest elevation of machinery or equipment servicing the building, the machinery or equipment being identified by the neural network.

7. The three-dimensional (3D) measurement and image system according to claim 1, wherein the one or more processors are further configured to determine the elevation of a bottom of floors of parked vehicles and doors of parked vehicles.

8. The three-dimensional (3D) measurement and image system according to claim 1, wherein the one or more processors are further configured to determine elevations of a critical infrastructure component, the critical infrastructure component being identified by the neural network.

9. The three-dimensional (3D) measurement and image system according to claim 1, wherein the one or more processors are further configured to produce a photo-realistic image and/or video with water fit to and around objects in the at least one of the still images and/or video frames according to a determined or received elevation.

10. The three-dimensional (3D) measurement and image system according to claim 1, wherein the one or more processors are further configured to combine a first-floor elevation and a photo-realistic image with at least one other location-specific data point.

11. The three-dimensional (3D) measurement and image system according to claim 10, wherein the at least one other location-specific data point is a property ownership, a map location, an address, a valuation, a land use, or a combination thereof.

12. The three-dimensional (3D) measurement and image system according to claim 1, wherein the one or more processors are further configured to produce modelled elevation data for the first-floor elevation for an individual property or a plurality of properties in a defined geographic area.

13. The three-dimensional (3D) measurement and image system according to claim 1, wherein the one or more processors are further configured to compare video frames and/or still images from two or more video cameras and infer depth of field from of parallax from the video frames and/or still images.

14. The three-dimensional (3D) measurement and image system according to claim 1, wherein the one or more processors are further configured to determine a probability that the object and/or environmental feature will be below a determined elevation.

15. The three-dimensional (3D) measurement and image system according to claim 1, further comprising an integrated instrument package mounted on a vehicle, the integrated instrument package including:

a plurality of video cameras mounted at a same relative elevation and oriented to produce parallel views creating a stereoscopic effect;

at least one light detection and ranging (LiDAR) sensor;

at least one global positioning system (GPS) receiver;

a data acquisition and control computer; and controller circuitry operably coupled to the plurality of video cameras, the at least one LiDAR sensor, the GPS receiver, and the data acquisition and control computer;

wherein the controller circuitry configured to synchronize shutters of the plurality of video cameras to produce precisely timed simultaneous video frames and still images, LiDAR sensor data returned point cloud frames and images, and GPS position readings.

16. The three-dimensional (3D) measurement and image system according to claim 15, wherein the vehicle is an automobile.

17. The three-dimensional (3D) measurement and image system according to claim 16, wherein the controller circuitry and the data acquisition and control computer are positioned within the automobile, and the plurality of video cameras, at least one LiDAR sensor, and GPS receiver are mounted on top of a mounting plate that is coupled to the top of the automobile.

18. A method, comprising:

receiving still images and/or video frames, light detection and ranging (LiDAR) point cloud frames and/or images, and global position system (GPS) position readings;

aligning the LiDAR point cloud frames and/or images with a spatially and temporally consistent still image and/or video frame;

associating the GPS position readings with corresponding LiDAR point cloud frames and/or images;

assigning relative-position 3-dimensional coordinates, relative to a position of a LiDAR sensor, to every pixel in the spatially and temporally consistent still image and/or video frame;

transforming the relative-position 3-dimensional coordinates for every pixel into 3-dimensional coordinates referenced to GPS coordinates and one or more vertical elevation datums;

using a neural network to identify an object and/or environmental feature in the spatially and temporally consistent still image and/or video frame and infer a GPS position and elevation of the object and/or environmental feature based on the 3-dimensional coordinates referenced to GPS coordinates and one or more vertical elevation datums for pixels representing the object and/or environmental feature; and determining a first-floor elevation of a building and/or elevation of attached garage slab or floor based on the elevation of the object and/or environmental feature.

\*   \*   \*   \*   \*